United States Patent
Kondo et al.

(10) Patent No.: US 12,162,280 B2
(45) Date of Patent: Dec. 10, 2024

(54) PRINTING APPARATUS HAVING OPERATING MODE IN WHICH INK EJECTION IS SHARED BY FIRST HEAD AND SECOND HEAD AT PRESCRIBED CONTRIBUTION RATIO

(71) Applicant: Brother Kogyo Kabushiki Kaisha, Nagoya (JP)

(72) Inventors: Tomoya Kondo, Nagoya (JP); Shota Morikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 79 days.

(21) Appl. No.: 17/656,253

(22) Filed: Mar. 24, 2022

(65) Prior Publication Data
US 2022/0305774 A1    Sep. 29, 2022

(30) Foreign Application Priority Data
Mar. 25, 2021    (JP) .................. 2021-052061

(51) Int. Cl.
*B41J 2/045*    (2006.01)

(52) U.S. Cl.
CPC ....... *B41J 2/04551* (2013.01); *B41J 2/04586* (2013.01)

(58) Field of Classification Search
CPC .................. B41J 2/04551; B41J 2/04586
See application file for complete search history.

(56) References Cited

U.S. PATENT DOCUMENTS

| | | | | |
|---|---|---|---|---|
| 6,299,287 B1 * | 10/2001 | Williams | ............... | B41J 19/147 347/15 |
| 6,530,647 B2 * | 3/2003 | Kubota | ............... | B41J 2/14201 347/42 |
| 2010/0321434 A1 | 12/2010 | Baba | | |
| 2014/0104335 A1 * | 4/2014 | Kawatoko | ............... | B41J 2/2121 347/9 |
| 2014/0160214 A1 * | 6/2014 | Conesa | ............... | B41J 2/04 347/101 |

FOREIGN PATENT DOCUMENTS

| | | |
|---|---|---|
| JP | 2011-25685 A | 2/2011 |
| JP | 2015-066836 A | 4/2015 |
| JP | 2016-040083 A | 3/2016 |

OTHER PUBLICATIONS

Office Action mailed in corresponding Japanese Patent Application No. 2021-052061, Sep. 17, 2024.

* cited by examiner

*Primary Examiner* — Jason S Uhlenhake
(74) *Attorney, Agent, or Firm* — Merchant & Gould P.C.

(57) ABSTRACT

In a printing apparatus, a carriage is reciprocally movable in first and second directions. A control device is configured to perform executing one of first and second printing operations in accordance with an operation mode. The first printing operation prints a first image over a first range in a third direction crossing the first and second directions by ejecting ink from both first and second heads during one movement of the carriage in the first and second directions. The second printing operation prints a second image over a second range narrower than the first range in the third direction by ejecting ink from both the first and second heads during the one movement of the carriage. Ink ejection contribution during the one movement of the carriage is shared by the first and second heads at a prescribed contribution ratio in the second printing operation.

16 Claims, 11 Drawing Sheets

FIG. 8

| | ONE PASS | | | |
|---|---|---|---|---|
| | 0.5 | 0.5 | 0.5 | 0.5 |
| | 0.5 | 0.8 | 0.8 | 0.8 |
| | 0.5 | 0.8 | 1.0 | 1.0 |
| | 0.5 | 0.5 | 0.8 | 0.8 |
| | 0.5 | 0.5 | 0.5 | 0.5 |
| | 0 | 0 | 0 | 0 |
| | 0 | 0 | 0 | 0 |
| | 0 | 0 | 0 | 0 |
| | 0 | 0 | 0 | 0 |
| | 0 | 0 | 0 | 0 |

FORWARD DIRECTION ↑ Ds

PRINTING APPARATUS HAVING OPERATING MODE IN WHICH INK EJECTION IS SHARED BY FIRST HEAD AND SECOND HEAD AT PRESCRIBED CONTRIBUTION RATIO

CROSS REFERENCE TO RELATED APPLICATIONS

This application claims priority from Japanese Patent Application No. 2021-052061 filed Mar. 25, 2021. The entire content of the priority application is incorporated herein by reference.

BACKGROUND

A recent printing technology known in the art performs printing on a printing medium by ejecting ink from a plurality of print heads. In this technology, for example, a single carriage is provided with two print heads that are offset but partially overlapped in a direction orthogonal to the scanning direction of the carriage. An apparatus using this conventional technology can perform printing on a printing medium at a high speed by ejecting ink from the two print heads while moving the carriage in the scanning direction.

SUMMARY

However, colors printed by the heads of this conventional printing apparatus do not always meet the user's expectations, requiring the user to adjust these colors. For such cases, there is a known technique of color calibration performed by printing patches and measuring the colors of the printed patches.

However, the heads provided in the conventional printing apparatus described above have individual differences owing to variation in manufacturing precision and the like for each head, resulting in differences in color reproducibility among heads. An example of variation in manufacturing precision is manufacturing error in nozzle diameters, resulting in different quantities of ink being ejected from different nozzles.

To overcome this problem, patches are printed using each of the plurality of heads, and colors of the printed patches are measured. Using these measurements, colors are adjusted to compensate for individual ink ejection quantities from the heads in order to achieve uniform color reproducibility. However, achieving uniform color reproduction properties among a plurality of print heads is difficult.

In view of the foregoing, it is an object of the present disclosure to provide a printing apparatus, a printing method, and a storage medium storing a set of computer-readable instructions for achieving high color reproducibility when printing using a plurality of heads.

In order to attain the above and other objects, according to one aspect, the present disclosure provides a printing apparatus including: a first head; a second head; a carriage; a storage device; and a control device. The first head has at least one first nozzle. The at least one first nozzle is configured to eject ink in a first color. The second head has at least one second nozzle. The at least one second nozzle is configured to eject ink in a second color same as the first color. The carriage is configured to support the first head and the second head. The carriage is reciprocally movable in a first direction and a second direction opposite to the first direction. The control device is configured to perform: (a) setting; and (b) executing. The (a) setting sets an operation mode to one of a first mode and a second mode. The (b) executing executes one of a first printing operation and a second printing operation in accordance with the operation mode set in the (a) setting. The first printing operation is performed in a case where the first mode is set as the operation mode. The second printing operation is performed in a case where the second mode is set as the operation mode. The first printing operation prints a first image over a first range in a third direction crossing the first direction and the second direction by ejecting ink from both the first head and the second head during one movement of the carriage in the first direction and the second direction. The second printing operation prints a second image over a second range in the third direction by ejecting ink from both the first head and the second head during the one movement of the carriage in the first direction and the second direction. The second range is narrower than the first range in the third direction. Ink ejection contribution during the one movement of the carriage in the first direction and the second direction is shared by the first head and the second head at a prescribed contribution ratio in the second printing operation.

According to the configuration described above, in the second mode, ink ejection contribution is shared by the first head and the second head at the prescribed contribution ratio, and an image is printed over a narrower range in the third direction than a range printed in the first mode by ejecting ink from both the first head and the second head during one movement of the carriage in the first direction and the second direction. Thus, printing with high color reproducibility can be executed with ink ejected from both the first head and the second head.

According to another aspect, the present disclosure provides a printing method using a printing apparatus. The printing apparatus includes: a first head; a second head; and a carriage. The first head has a first nozzle. The first nozzle is configured to eject ink in a first color. The second head has a second nozzle. The second nozzle is configured to eject ink in a second color same as the first color. The carriage is configured to support the first head and the second head. The carriage is reciprocally movable in a first direction and a second direction opposite to the first direction. The printing method includes: (a) setting; and (b) executing. The (a) setting sets an operation mode of the printing apparatus to one of a first mode and a second mode. The (b) executing executes one of a first printing operation and a second printing operation with the printing apparatus in accordance with the operation mode set in the (a) setting. The first printing operation is performed in a case where the first mode is set as the operation mode. The second printing operation is performed in a case where the second mode is set as the operation mode. The first printing operation prints a first image over a first range in a third direction crossing the first direction and the second direction by ejecting ink from both the first head and the second head during one movement of the carriage in the first direction and the second direction. The second printing operation prints a second image over a second range in the third direction by ejecting ink from both the first head and the second head during the one movement of the carriage in the first direction and the second direction. The second range is narrower than the first range in the third direction. Ink ejection contribution during the one movement of the carriage in the first direction and the second direction is shared by the first head and the second head at a prescribed contribution ratio in the second printing operation.

According to still another aspect, the present disclosure provides a non-transitory computer-readable storage medium storing a set of computer-readable instructions for a computer in a printing apparatus. The printing apparatus includes: a first head; a second head; and a carriage. The first head has a first nozzle. The first nozzle is configured to eject ink in a first color. The second head has a second nozzle. The second nozzle is configured to eject ink in a second color same as the first color. The carriage is configured to support the first head and the second head. The carriage is reciprocally movable in a first direction and a second direction opposite to the first direction. The set of computer-readable instructions, when executed by the computer, causes the printing apparatus to perform: (a) setting; and (b) executing. The (a) setting sets an operation mode to one of a first mode and a second mode. The (b) executing executes one of a first printing operation and a second printing operation in accordance with the operation mode set in the (a) setting. The first printing operation is performed in a case where the first mode is set as the operation mode. The second printing operation is performed in a case where the second mode is set as the operation mode. The first printing operation prints a first image over a first range in a third direction crossing the first direction and the second direction by ejecting ink from both the first head and the second head during one movement of the carriage in the first direction and the second direction. The second printing operation prints a second image over a second range in the third direction by ejecting ink from both the first head and the second head during the one movement of the carriage in the first direction and the second direction. The second range is narrower than the first range in the third direction. Ink ejection contribution during the one movement of the carriage in the first direction and the second direction is shared by the first head and the second head at a prescribed contribution ratio in the second printing operation.

According to the present disclosure, the printing apparatus provided with a plurality of heads can perform suitable printing with high color reproducibility using the plurality of heads.

BRIEF DESCRIPTION OF THE DRAWINGS

The particular features and advantages of the disclosure as well as other objects will become apparent from the following description taken in connection with the accompanying drawings, in which:

FIG. 8 is a schematic diagram of an image process in which the color gamut is different when printing by moving the first head and the second head of the printing apparatus in a forward direction of a main scanning direction and when printing by moving the first head and the second head in a return direction of the main scanning direction;

DETAILED DESCRIPTION

Next, a printing apparatus 1 according to an embodiment of the present disclosure will be described, but the present disclosure is not limited to the printing apparatus 1 in the embodiment described below. In the following embodiment, a first head 10 and a second head 20 eject ink at a contribution percentage of 100% each when the printing apparatus 1 performs printing in a first mode, while the contribution percentages of the first head 10 and second head 20 together total 100% when the printing apparatus 1 performs printing in a second mode. However, these contribution percentages of ink ejection are not limited to 100%, as will be described below. Therefore, the present disclosure is not limited to the following embodiment, and elements may be added, omitted, and modified without departing from the spirit of the disclosure.

Figure 1:
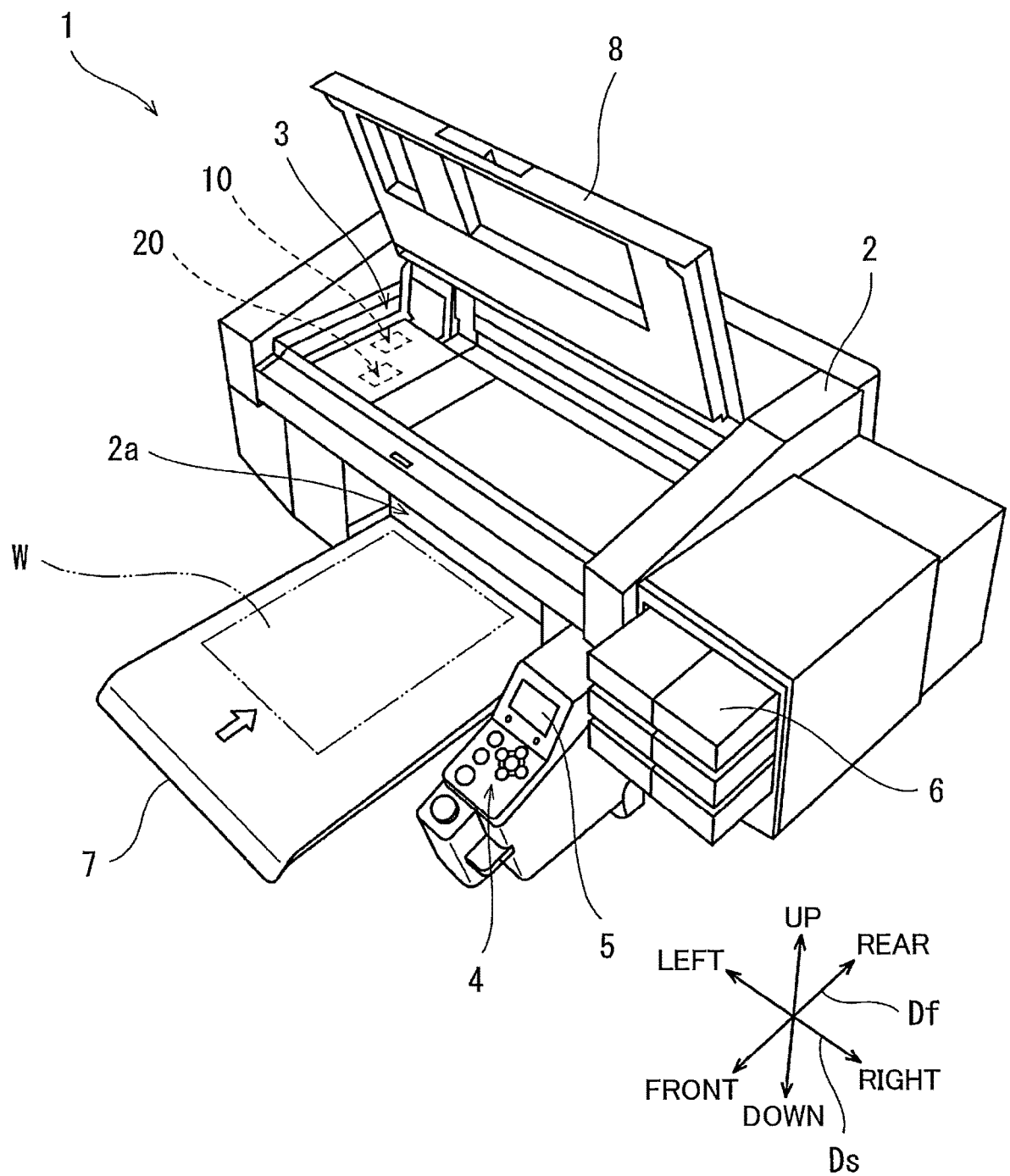
FIG. 1 is a perspective view illustrating a printing apparatus according to one embodiment of the present disclosure.

FIG. 1 is a perspective view showing the printing apparatus 1 according to one embodiment. The concept of directions in this specification and documentation for the claims conform to the up-down direction, left-right direction, and front-rear direction that are each orthogonal to the others, as illustrated in FIG. 1. The left-right direction is also a main scanning direction Ds, and the front-rear direction is also a conveying direction Df of a printing medium W. More specifically, the conveying direction Df indicates a frontward direction. Thus, the conveying direction Df is orthogonal to the main scanning direction Ds.

Figure 2:
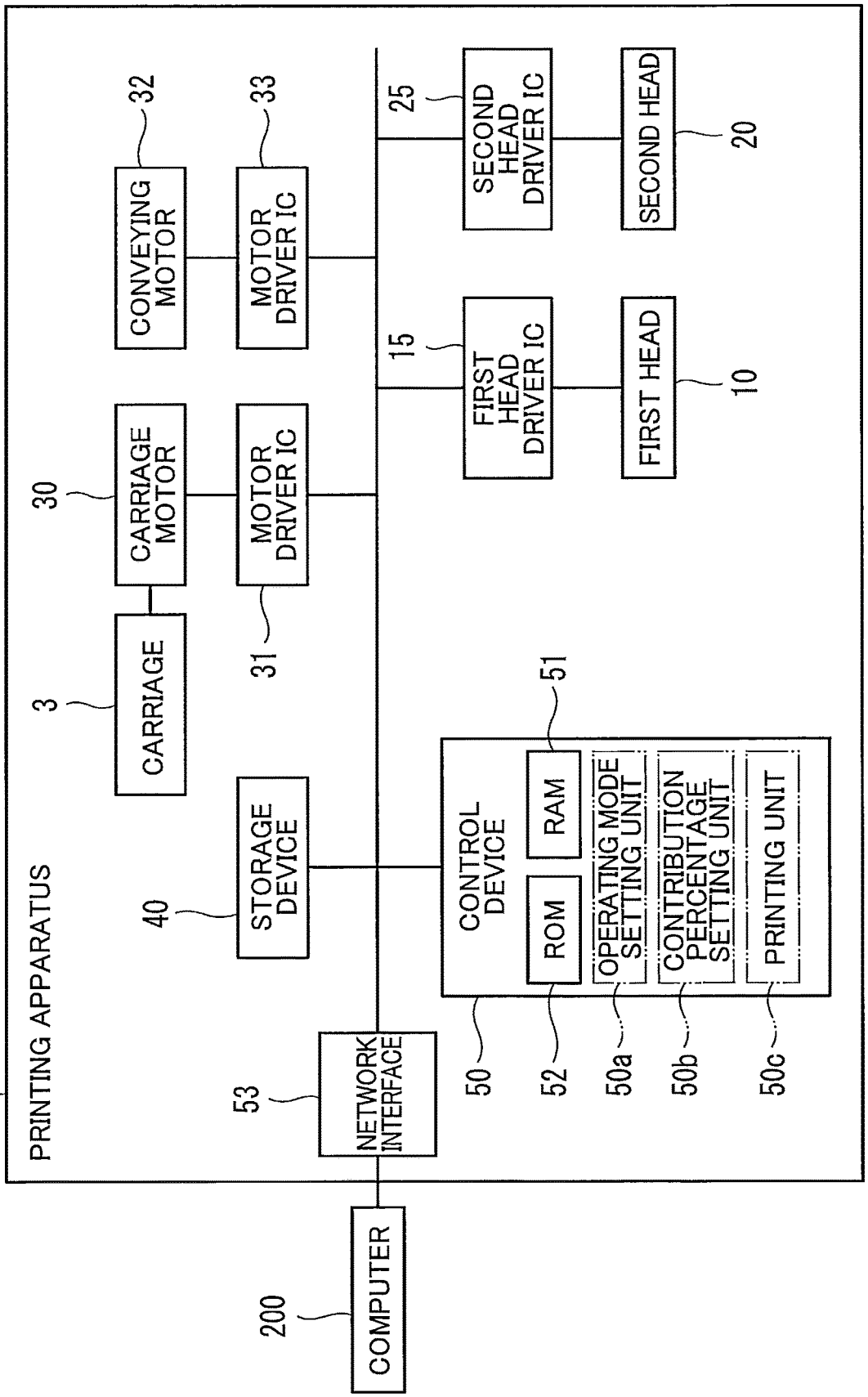
FIG. 2 is a block diagrams illustrating the primary configuration of the printing apparatus illustrated in FIG. 1.

As shown in FIG. 1, the printing apparatus 1 according to the present embodiment is provided with a casing 2, operating keys 4, a display unit 5, ink tanks 6, a tray 7, a top cover 8, a carriage 3, and a control device 50 (see FIG. 2). The carriage 3 is capable of reciprocating in the main scanning direction Ds. A first head 10 and a second head 20 described later are provided in the carriage 3. The printing apparatus 1 has a first mode and a second mode for printing images using both the first head 10 and second head 20. The printing apparatus 1 prints images with higher color reproducibility in the second mode than in the first mode.

The casing 2 is formed in a box shape, for example. The casing 2 has an opening 2a formed in the front surface thereof for supplying a printing medium W into the casing 2 and discharging a printing medium W from the casing 2. The printing medium W is fixed to the tray 7, and the tray 7 is conveyed in both the conveying direction Df (i.e., the frontward direction) orthogonal to the main scanning direction Ds (the moving direction of the carriage 3) and the direction opposite to the conveying direction Df (i.e., the rearward direction) by a conveying motor 32 (see FIG. 2). The conveying motor 32 is an example of the conveying device of the present disclosure, and is provided in the casing 2. Hence, the printing medium W is conveyed from the outside to the inside of the casing 2 through the opening 2a and is conveyed (discharged) from the inside to the outside of the casing 2 through the opening 2a.

The operating keys 4 are provided in a location rightward and forward of the casing 2. The display unit 5 is disposed in a position to the rear of the operating keys 4. The operating keys 4 receive operations inputted by the user. The display unit 5 is configured of a touchscreen, for example, that displays prescribed information. Part of the display unit 5 functions as operating keys at prescribed timings. The control device 50 (see FIG. 2) implements a print function based on external input such as input from the operating keys 4 and controls the display on the display unit 5.

FIG. 2 is a block diagram showing the primary configuration of the printing apparatus 1 shown in FIG. 1. As shown in FIG. 2, the printing apparatus 1 of the present embodiment is provided with the control device 50. The control device 50 is an example of the control device and computer of the present disclosure, and possesses a CPU (not shown), a RAM 51, a ROM 52, and the like. The printing apparatus 1 is also provided with a storage device 40 that stores various information. A flash memory, a hard disk drive, or the like may be used for the storage device 40. As an alternative, the storage device 40 can be included in the control device 50.

The RAM 51 temporarily stores print jobs received from a computer 200 or other external personal computer via a network interface 53. The RAM 51 also temporarily stores print data for each pass of a printing process. One pass is the width of the printing medium W in the conveying direction Df that is printed with a single head, where "width" includes the width when printing using all nozzles of the head and the width when printing using only some of the nozzles of the head. The ROM 52 stores the printing program of the present embodiment and a control program for performing various data processing.

The printing apparatus 1 also has a first head driver IC 15 for controlling the first head 10, and a second head driver IC 25 for controlling the second head 20. The printing apparatus 1 also has a motor driver IC 31, and a motor driver IC 33. The motor driver IC 31 controls a carriage motor 30 to actuate the carriage 3. The motor driver IC 33 controls the conveying motor 32 to convey the printing medium W. While a printing medium W is fixed to the tray 7, the conveying motor 32 conveys the tray 7 in the conveying direction Df or the direction opposite to the conveying direction Df, those are orthogonal to the moving direction of the carriage 3 (i.e., the main scanning direction Ds).

As its functional configuration, the control device 50 has an operating mode setting unit 50a, a contribution percentage setting unit 50b, and a printing unit 50c. The operating mode setting unit 50a sets the operating mode of the printing apparatus 1 to one of a first mode, and a second mode for printing images with higher color reproducibility than in the first mode. The contribution percentage setting unit 50b sets the contribution percentage of ink ejection for each of the first head 10 and second head 20 with respect to the density of dots constituting the image when printing in the second mode. That is, the contribution percentage setting unit 50b sets contribution percentages of ink ejection so that the overall percentage of contribution for the first head 10 and second head 20 totals 100%. Contribution ratios for the first head 10 and second head 20 include 50:50(%), 70:30(%), and 60:40(%). The printing unit 50c executes printing by ejecting ink with a contribution percentage of 100% for each of the first head 10 and second head 20 when the operating mode is set to the first mode and executes printing by ejecting ink so that the contribution percentages of ink ejection from the first head 10 and second head 20 total 100% when the operating mode is set to the second mode. The contribution ratio of ink ejection is an example of the prescribed contribution ratio of the present disclosure. The contribution percentage of ink ejection is an example of the ink ejection contribution percentage of the present disclosure.

The information stored in the storage device 40 includes nozzle property information. Nozzle property information specifies ink ejection properties for the plurality of nozzles provided in the first head 10 and second head 20. Nozzle property information includes information indicating variation in the diameters of the nozzles (hereinafter called "nozzle diameter") and information indicating the minimum droplet quantity of ink ejected from the nozzles. The storage device 40 also stores measured values for the shapes of ink channels in the first head 10 measured during manufacturing of the first head 10, measured values for the shapes of ink channels in the second head 20 measured during manufacturing of the second head 20, the median (design value) for the shape of ink channels in the first head 10, and the median (design value) for the shape of ink channels in the second head 20.

The storage device 40 also stores priority level information indicating priority levels based on the layout of the first head 10 and second head 20. Priority levels will be described later.

When executing a prescribed printing program, the control device 50 controls the motor driver IC 31 to actuate the carriage motor 30 and controls the motor driver IC 33 to actuate the conveying motor 32. In parallel with this operation control, the control device 50 controls the first head driver IC 15 to actuate the first head 10 and controls the second head driver IC 25 to actuate the second head 20 based on raster data for ejecting ink droplets according to the image being formed on the printing medium W.

Thus, the motor driver IC 33 controls driving of the conveying motor 32 based on commands received from the control device 50, and the motor driver IC 31 controls driving of the carriage motor 30 based on commands received from the control device 50. The first head driver IC 15 controls the first head 10 to eject ink based on commands received from the control device 50, and the second head driver IC 25 controls the second head 20 to eject ink based on commands received from the control device 50. Through this control, ink of prescribed quantities is ejected from the first head 10 and second head 20.

Hence, in a conveying process, the conveying motor 32 is driven to convey the printing medium W downstream in the conveying direction Df (i.e., frontward). Note that prior to the conveying process in a printing process, the printing medium W is conveyed upstream in the conveying direction Df. In other words, the printing medium W is conveyed in the direction opposite to the conveying direction Df (i.e., frontward). In a carriage moving process, the carriage motor 30 is driven to move the carriage 3 in the main scanning direction Ds. As the carriage 3 moves in the main scanning direction Ds in this way, the control device 50 performs an ink ejection process to eject ink from the first head 10 and second head 20 provided in the carriage 3. When performed in combination, these operations implement the printing process.

Figure 3A:
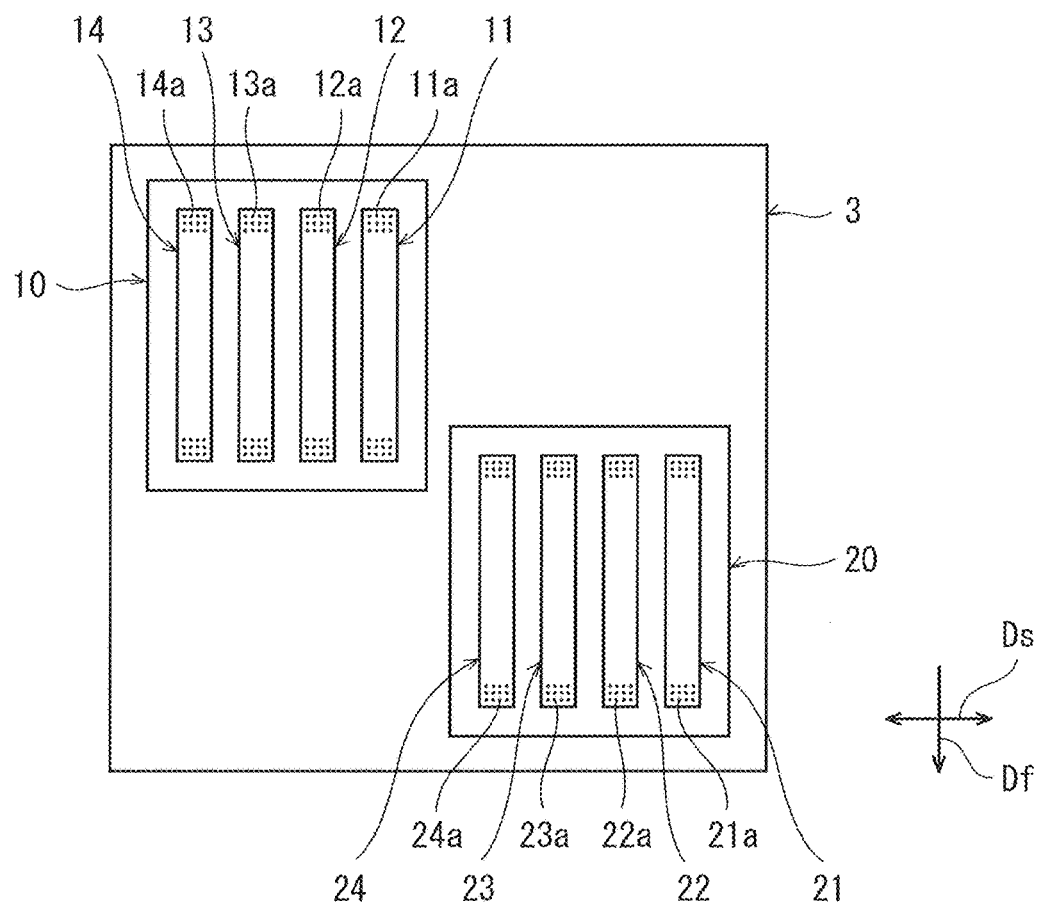
FIG. 3A is a plan view schematically illustrating a first head and a second head provided in a carriage of the printing apparatus illustrated in FIG. 1.
Figure 3B:
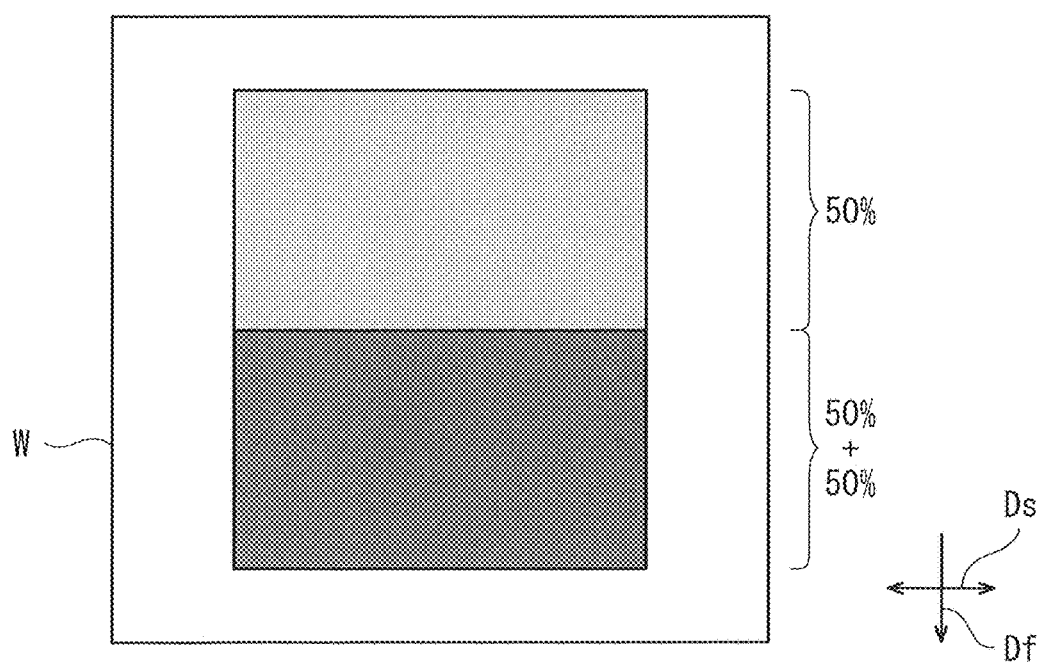
FIG. 3B is a plan view schematically illustrating printing results by the first head and the second head in a second mode.

FIG. 3A is a plan view schematically illustrating the first head 10 and second head 20 provided in the carriage 3 of the printing apparatus 1 shown in FIG. 1. FIG. 3B is a plan view schematically illustrating printing results by the first head 10 and second head 20 in the second mode. As shown in FIG. 3A, the first head 10 and second head 20 are supported on a printing surface (bottom surface) of the carriage 3. The first head 10 has nozzles that eject ink, and the second head 20 has nozzles that eject ink in the same colors as the first head 10. The first head 10 and second head 20 are arranged to be partially overlapped in the conveying direction Df.

The first head 10 and second head 20 are each provided with a plurality of nozzle row sets, with each set of nozzle rows corresponding to a different color of ink. The sets of nozzle rows in each head are juxtaposed at regular intervals in the main scanning direction Ds. Specifically, the first head 10 has a nozzle row set 11 for yellow (Y), a nozzle row set 12 for magenta (M), a nozzle row set 13 for cyan (C), and a nozzle row set 14 for black (K) that eject ink in the respective colors (collectively referred to as color inks). Similarly, the second head 20 has a nozzle row set 21 for yellow, a nozzle row set 22 for magenta, a nozzle row set 23 for cyan, and a nozzle row set 24 for black. Each set of nozzle rows includes a plurality of nozzles (black dots indicated in the drawing using the same reference numerals with an appended "a"). While nozzles are only indicated on the ends of the nozzle row sets in FIG. 3A, nozzles are actually provided over the entire surface of each nozzle row set. The numbers of nozzle row sets shown in the drawing are merely one example. While the carriage 3 is in an idle position (the left side, as shown in FIG. 1), the nozzle row sets in the respective first head 10 and second head 20 are arranged in the order of nozzle row sets 11 and 21 for yellow, nozzle row sets 12 and 22 for magenta, nozzle row sets 13 and 23 for cyan, and nozzle row sets 14 and 24 for black beginning from the right side and progressing leftward.

The contribution percentage setting unit 50b of the control device 50 executes a contribution percentage setting process for setting the contribution percentage of ink ejection from each of the first head 10 and second head 20 with respect to the density of dots constituting the image being printed in the second mode. The contribution percentage of each of the first head 10 and second head 20 can be set based on conditions described later for selecting the head with the higher contribution percentage. In other words, the contribution percentage setting process executed by the control device 50 in the second mode includes a selection process described later.

In the contribution percentage setting process, the control device 50 can vary the contribution percentages assigned to the first head 10 and second head 20 for printing in the second mode. In the example of FIG. 3B, the first head 10 is responsible for 50% and the second head 20 for 50%, resulting in a total of 100% when the printing is executed. However, printing can be executed using other contribution ratios. That is, when printing is executed under the second mode, the first head 10 ejects ink at the contribution percentage for the first head 10 and the second head 20 ejects ink at the contribution percentage for the second head 20 for a total ink ejection quantity of 100% in order to reproduce a single color through cooperation with the first head 10 and second head 20. The contribution ratio of the first head 10 and second head 20 is set such that the contribution percentage for each of the first head 10 and second head 20 is greater than 0% and the total contribution percentage is equivalent to 100%. Sample contribution ratios are 30:70 and 60:40.

When the contribution percentage for the first head 10 is 30% and the contribution percentage for the second head 20 is 70%, for example, the control device 50 divides the raster data produced through rasterization into raster data for the first head 10 and raster data for the second head 20. The control device 50 performs a masking process to mask the raster data for the first head 10 and the raster data for the second head 20. Since the contribution percentage for the first head 10 is 30%, raster data for the first head 10 is generated using mask data that masks 70% of the original raster data, leaving 30% of the original raster data for ejecting ink using the first head 10. Similarly, since the contribution percentage for the second head 20 is 70%, raster data for the second head 20 is generated using mask data that masks 30% of the original raster data, leaving 70% of the original raster data for ejecting ink using the second head 20. In the subsequent printing process, the first head 10 prints in accordance with its contribution percentage by ejecting ink based on the raster data for the first head 10. Similarly, the second head 20 prints in accordance with its contribution percentage by ejecting ink based on the raster data for the second head 20.

Figure 4:
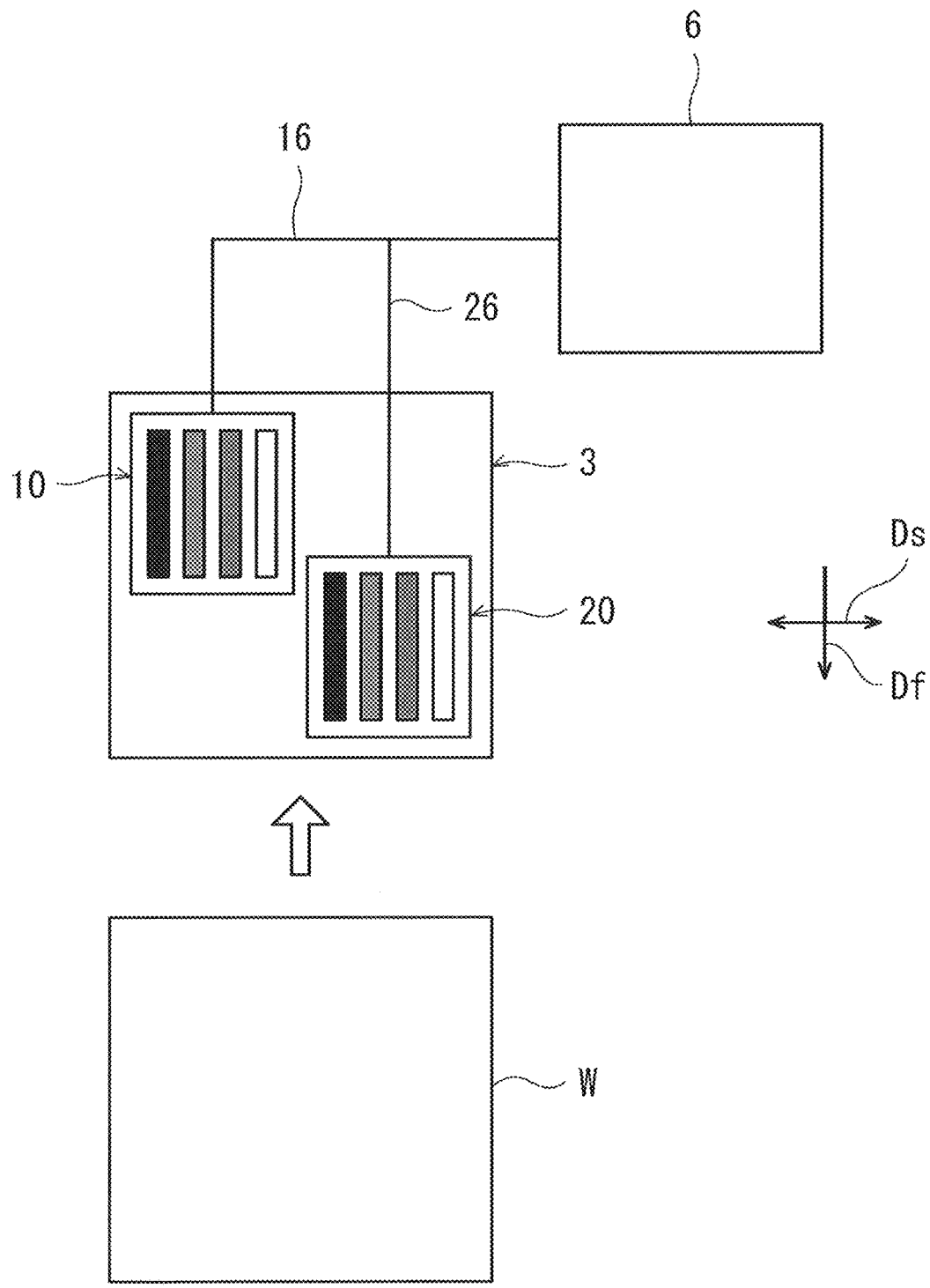
FIG. 4 is a schematic diagram illustrating a layout of an ink tank, the first head, and the second head in the printing apparatus illustrated in FIG. 1, and a conveying direction of a printing medium.

FIG. 4 is a schematic diagram showing the layout of the ink tanks 6, first head 10, and second head 20 in the printing apparatus 1 of FIG. 1, and the conveying direction Df of the printing medium W. In FIG. 4, the nozzle row sets described above with reference to FIG. 3A are depicted only with shading. While ink tanks 6 are provided for the four different ink colors described above, only one ink tank 6 is depicted in FIG. 4. Each ink tank 6 provided in the printing apparatus 1 is connected to the first head 10 by a first ink tube 16. Each ink tank 6 is connected to the second head 20 by a second ink tube 26. The first ink tubes 16 and second ink tubes 26 are ink channels. Since the first head 10 and second head 20 are offset from each other but partially overlapped in the conveying direction Df, the second ink tube 26 in this example is longer than the first ink tube 16.

The conveying motor 32 conveys the printing medium W in the conveying direction Df so that the printing medium W is discharged out through the opening 2a (see FIG. 1). In this example, the second head 20 is positioned downstream (frontward) in the conveying direction Df of the printing medium W (indicated by the arrow shown in FIGS. 3A and 4) from the first head 10 in the carriage 3. The second head 20 is also positioned downstream in the main scanning direction Ds from the first head 10 in the carriage 3 when the carriage 3 moves in the main scanning direction Ds from the idle position, in this example. Priority levels are set based on these layout conditions of the first head 10 and second head 20 and the priority level information indicating these priority levels is stored in the storage device 40.

Priority levels can be set and stored as priority level information so that the head among the first head 10 and second head 20 connected by the shorter of the first ink tube 16 and second ink tube 26 is set to be a head with a higher priority level. In the present embodiment, the first head 10 corresponding to the first ink tube 16 can be set to have a higher priority level than the second head 20 corresponding to the second ink tube 26 longer than the first ink tube 16.

Alternatively, the head among the first head 10 and second head 20 positioned upstream in the main scanning direction Ds when the carriage 3 moves in the main scanning direction Ds from the idle position can be set to have a higher priority level and the corresponding priority level can be stored. In the present embodiment, the first head 10 is positioned upstream in the main scanning direction Ds when the carriage 3 moves in the main scanning direction Ds from the idle position and can be set to have a higher priority level than the second head 20. Alternatively, the head among the first head 10 and second head 20 positioned upstream in the conveying direction Df of the printing medium W can be set to have a higher priority level and the corresponding priority level information can be stored. In the present embodiment, the first head 10 is positioned upstream in the conveying direction Df of the printing medium W and can be set to have a higher priority level than the second head 20. Alternatively, the head among the first head 10 and second head 20 that is farther from the opening 2a can be set to have a higher priority level and the corresponding priority level information can be stored. In the present embodiment, the first head 10 is positioned farther from the opening 2a than the second head 20 is from the opening 2a, and can be set to have a higher priority level than the second head 210. The priority levels will be described later in detail.

When printing in the first mode on the printing apparatus 1 having the structure described above, the control device 50 ejects ink from each of the first head 10 and second head 20 at a contribution percentage of 100%. When printing in the second mode, the control device 50 ejects ink from the first head 10 and second head 20 so that the total contribution percentage of the first head 10 and second head 20 is equivalent to 100%.

Figure 5:
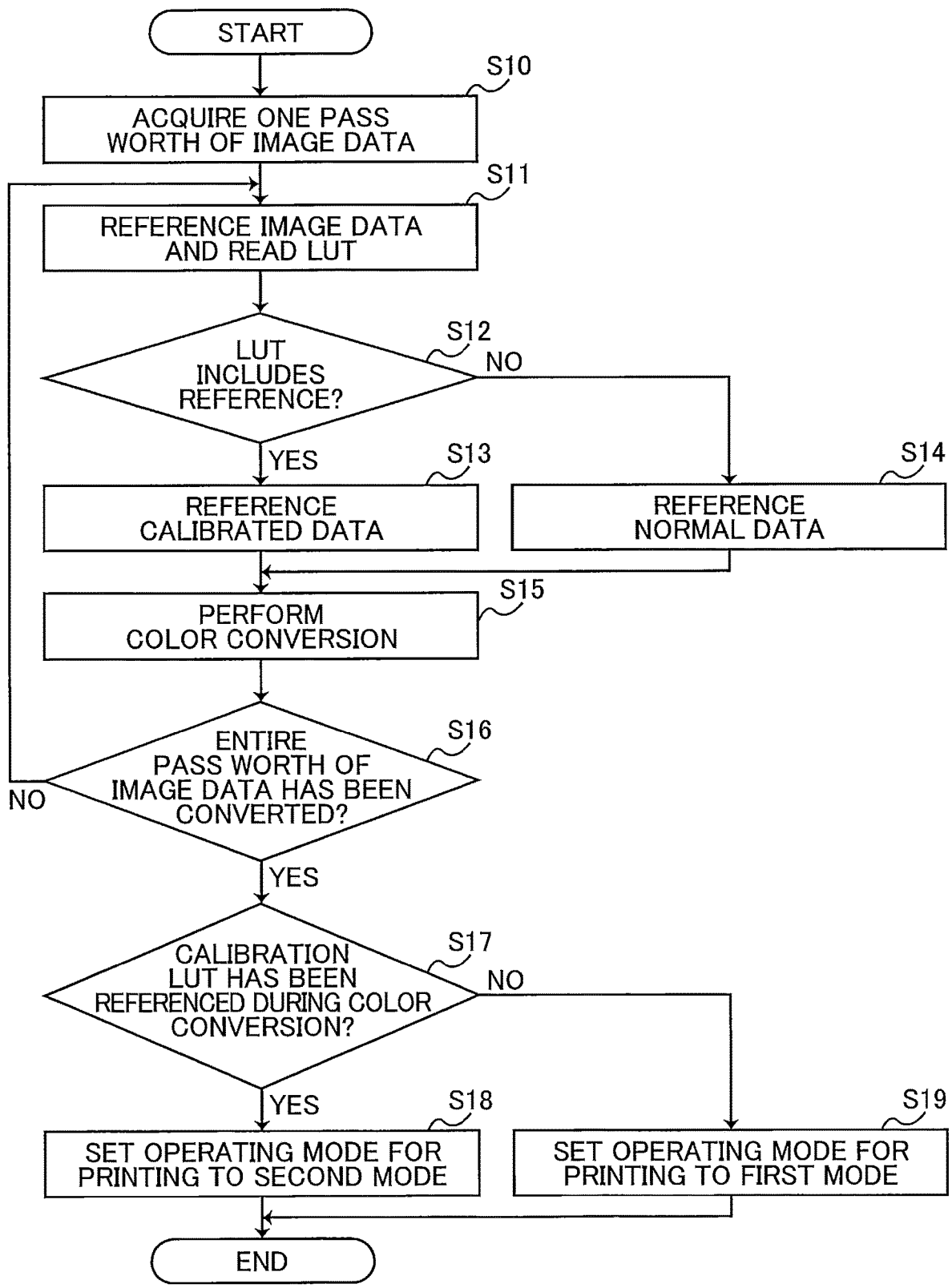
FIG. 5 is a flowchart illustrating steps in a process executed by a control device of the printing apparatus illustrated in FIG. 1 for setting an operating mode of the printing apparatus.

FIG. 5 is a flowchart illustrating steps in a process executed by the control device 50 of the printing apparatus 1 shown in FIG. 1 for setting the operating mode of the printing apparatus 1. Specifically, the operating mode setting unit 50a of the control device 50 sets the operating mode for one pass worth of printing to one of the first mode and second mode, as follows.

In S10 at the beginning of the process in FIG. 5, one pass worth of image data is inputted into the control device 50, and the control device 50 acquires the inputted image data. In S11 the control device 50 references the image data and reads a look-up table (hereinafter abbreviated as "LUT"). The LUT may possess a table of uncalibrated RGB values as well as a conversion table of calibrated RGB values, for example. Calibrated LUTs include LUTs possessing RGB data resulting from color calibration of the original RGB data.

In S12 the control device 50 determines whether the LUT includes a reference (a color-calibrated conversion table). If the LUT includes a reference (S12: YES), in S13 the control device 50 references the color-calibrated RGB data. If the LUT does not include a reference (S12: NO), in S14 the control device 50 references normal data constituting the original RGB values. Subsequently, in S15 the control device 50 performs color conversion on the inputted image data based on the LUT. In S16 the control device 50 determines whether the entire pass worth of image data has been converted. If there remains data to convert in the pass (S16: NO), the control device 50 returns to S11, reads the LUT, and repeats the above determination.

Once the entire pass worth of image data has been converted (S16: YES), in S17 the control device 50 determines whether a calibration LUT has been referenced during color conversion. If a calibration LUT has been referenced during color conversion (S17: YES), in S18 the control device 50 sets the operating mode for printing to the second mode and subsequently ends the process of FIG. 5. However, if a calibration LUT has not been referenced during color conversion (S17: NO), in S19 the control device 50 sets the operating mode for printing to the first mode and subsequently ends the process in FIG. 5. Note that the control device 50 may be configured to select a LUT based on correlations with printing media determined in advance since colors produced during printing may appear different when printed on different printing media.

The printing apparatus 1 performs printing by scanning the carriage 3 provided with the first head 10 and second head 20 in the main scanning direction Ds. When the control device 50 determines that printing is to be performed in the first mode (S19), the printing apparatus 1 performs printing by ejecting ink from both the first head 10 and second head 20. However, if the control device 50 determines that printing is to be performed in the second mode (S18), the printing apparatus 1 executes printing over a narrower range in the conveying direction Df of the printing medium W during one reciprocating movement of the carriage 3 than the range printed during one reciprocating movement of the carriage 3 in the first mode. At this time, the ink ejection contribution during one reciprocating movement of the carriage 3 in the main scanning direction Ds is shared by the first head 10 and second head 20 at a prescribed contribution ratio. For example, when determining that printing is being performed in the second mode (S18), the control device 50 divides printing responsibilities for one pass of printing between the first head 10 and second head 20 at prescribed contribution ratio so that contribution percentages total 100% (a divided halftone print). In this case, the feed amount of the printing medium W following the print for the pass is equivalent to the length of one head in the conveying direction Df.

On the other hand, if the control device 50 determines that printing is to be performed in the first mode (S19), the first head 10 and second head 20 both eject ink for one pass at a contribution percentage of 100%, thereby printing a total of two passes worth, for example. In this case, the feed amount for the printing medium W following the print for the pass (i.e., two passes worth of printing) is equivalent to the length of two heads (the first head 10 and second head 20) in the conveying direction Df Note that the width of one pass may be the width when printing using all nozzles of a single head, or the width when printing using only some of their nozzles. Further, the printing of two passes in the first mode does not include a method of printing known as shingling for partially overlapping neighboring passes to prevent the occurrence of unprinted areas on either side of a pass (bordering areas between neighboring passes). In other words, the width of a two-pass print is the width printed by the first head 10 and second head 20 supported in the carriage 3 and includes cases in which the printing width is less than twice the printing width of one pass, assuming all nozzles were used to print that one pass.

Next, the method of selecting one of the first head 10 and second head 20 to be the head with the higher contribution percentage of ink ejection in the second mode will be described. Examples of prescribed contribution ratios for the first head 10 and second head 20 are 70:30(%) and 60:40 (%). The following description focuses on selecting a head to have the higher contribution percentage in the contribution ratio. The control device 50 executes a contribution percentage setting process for setting the contribution percentages of ink ejection for the first head 10 and second head 20 with respect to the density of dots constituting the image being formed in the second mode. Specifically, the contribution percentage setting unit 50b of the control device 50 performs the contribution percentage setting process. When selecting a head to have the higher contribution percentage in the contribution ratio for ink ejection in the second mode, the control device 50 selects a head in good condition and a head whose ink quantity is easy to adjust.

Figure 6:
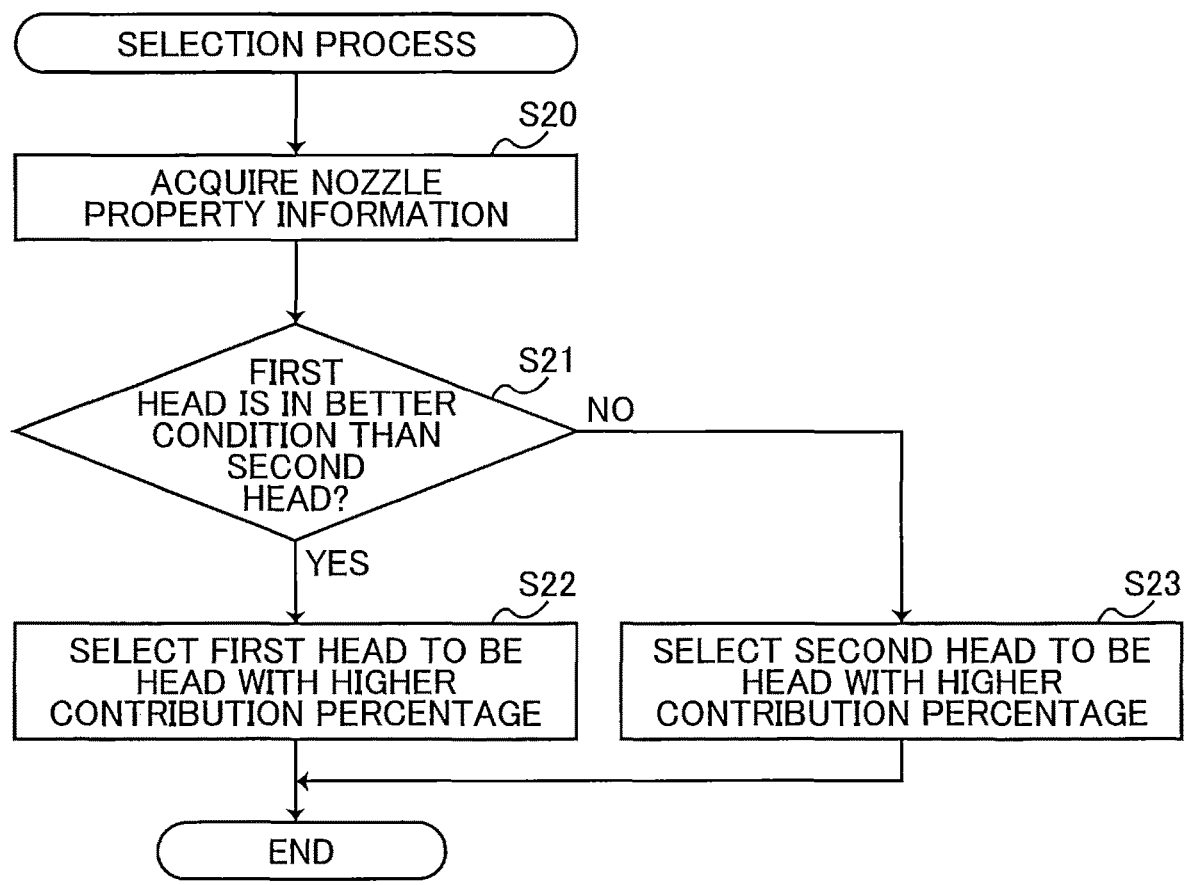
FIG. 6 is a flowchart illustrating steps in a first example of a selection process executed by the control device illustrated in FIG. 2.

FIG. 6 is a flowchart illustrating steps in a first example of a selection process executed by the control device 50 of the printing apparatus 1. The selection process of FIG. 6 is performed to select one of the first head 10 and second head 20 to have a higher contribution percentage of ink ejection when printing in the second mode. The first example of the selection process of FIG. 6 is an example of the (d-1) selecting of the present disclosure.

As described above, the storage device 40 stores nozzle property information indicating the ink ejection properties of nozzles. This nozzle property information may include information indicating the condition of nozzles such as variation in nozzle diameter and the minimum droplet quantity of ink ejected from the nozzles.

In S20 of the selection process in FIG. 6, the control device 50 acquires nozzle property information. The nozzle property information may be information on the condition of the nozzles. This information on nozzle condition includes the results of printing measurements conducted during manufacturing indicating. For example, the experimental results may indicate that the variation in nozzle diameter is small and that no nozzles with a small minimum droplet quantity exist.

In S21 the control device 50 determines whether the first head 10 is in better condition than the second head 20 based on this nozzle property information. For example, the control device 50 may determine that the first head 10 is in better condition when the first head 10 has a smaller variation in nozzle diameter or, unlike the second head 20, does not include any nozzles with a small minimum droplet quantity.

If the control device 50 determines that the first head 10 is in better condition (S21: YES), in S22 the control device 50 selects the first head 10 to be a head with a higher contribution percentage, and subsequently ends the selection process. However, if the control device 50 determines that the second head 20 is in better condition than the first head 10 (S21: NO), in S23 the control device 50 selects the second head 20 to be a head with a higher contribution percentage, and subsequently ends the selection process. In the first example of the selection process described above, the control device 50 selects a head with a higher contribution percentage based on the consideration that the head in better condition will have more stable ink ejection.

In the first example of the selection process described above, the determination in S21 for determining whether the first head 10 is in better condition than the second head 20 can be achieved with one of the following embodiments.

In one embodiment, the nozzle property information described above may be information indicating variation in the diameters of the plurality of nozzles in the first head 10 and second head 20. Thus, in the first example of the selection process, the control device 50 can select the first head 10 or second head 20 that has the smaller variation in nozzle diameter to be a head with a higher contribution percentage of ink ejection when printing in the second mode. This selection assumes that the head having the smaller variation in nozzle diameter will have more stable ink ejection.

As another embodiment, the nozzle property information may be information indicating the minimum droplet quantity of ink ejected from each of the plurality of nozzles in the first head 10 and second head 20. In the first example of the selection process, the control device 50 can select the first head 10 or second head 20 having the larger minimum droplet quantity ejected from its nozzles to be a head with a higher contribution percentage of ink ejection. This selection is made based on the consideration that ink quantity is easier to adjust in a head having a larger minimum droplet quantity.

Figure 7:
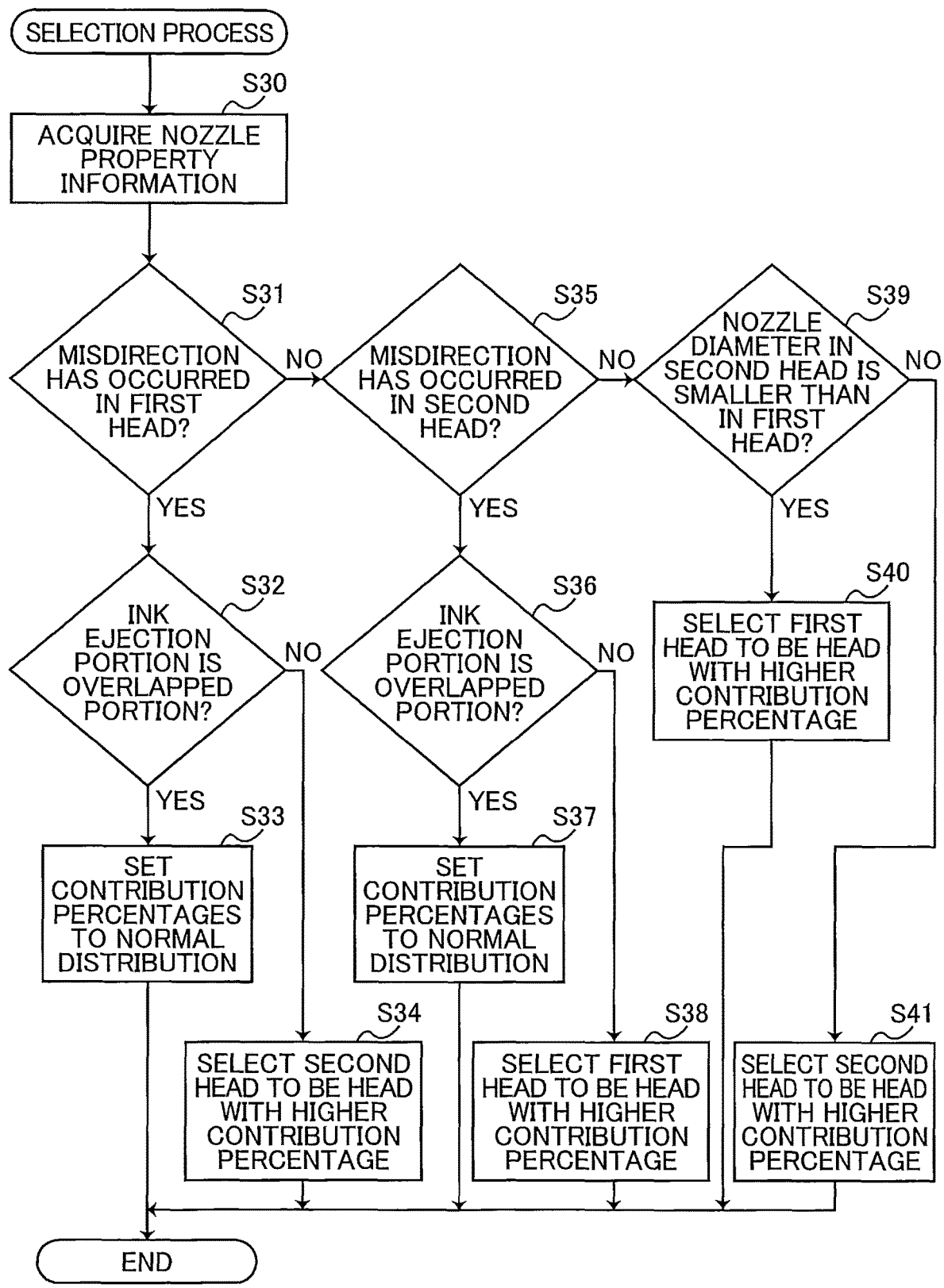
FIG. 7 is a flowchart illustrating steps in a second example of the selection process executed by the control device illustrated in FIG. 2.

FIG. 7 is a flowchart illustrating steps in a second example of the selection process executed by the control device 50 in the printing apparatus 1. The second example of the selection process is an example of the (c-2) selecting of the present disclosure.

As shown in FIG. 3A and described above, the first head 10 and second head 20 supported in the carriage 3 are arranged offset from each other but in a partially overlapped state in the conveying direction Df. In other words, each of the first head 10 and second head 20 has a portion in which the first head 10 and second head 20 overlap in the conveying direction Df (overlapped portion) and a portion in which the first head 10 and second head 20 do not overlap in the conveying direction Df (non-overlapped portion). When printing is performed, printing artifacts may be produced in a printing area printed by using nozzles of the overlapped portion. Therefore, when printing in the second mode, the control device 50 can perform printing using a normal distribution of ink ejection between the first head 10 and second head 20 so as to avoid such printing artifacts being produced. In this way, the control device 50 can prevent a drop in color reproducibility in printing areas printed by using nozzles in the overlapped portion. When printing artifacts are produced in printing areas printed by using nozzles in the non-overlapped portion, on the other hand, the control device 50 performs printing by ejecting ink from the first head 10 and second head 20 at the prescribed contribution ratio.

Note that a normal distribution sets contribution percentages of the first head 10 and second head 20 which is set in advance such that the contribution percentages of the first head 10 and second head 20 total 100% in order that the printing area printed by nozzles in the overlapped portion does not have a density difference perceivable by the user from printing areas printed by nozzles in the non-overlapped portions. The contribution percentages of the first head 10 and second head 20 corresponding to the normal distribution is pre-stored in the storage device 40, and may be different from the contribution percentages set by the prescribed contribution ratio. The contribution percentages of the first head 10 and second head 20 corresponding to the normal distribution will be simply denoted as normal distribution.

In S30 at the beginning of the selection process shown in FIG. 7, the control device 50 acquires nozzle property information. In S31 the control device 50 first determines whether any misdirection of ink ejection has occurred in the first head 10. "Misdirection" includes a condition in which ink droplets land at positions on the printing medium W offset from their prescribed positions, for example. Misdirection can be confirmed in advance using a pin check pattern or a nozzle irregularity pattern, for example. Here, determining whether misdirection of ink ejection has occurred can be a process of determining whether the frequency of misdirection occurrences exceeds a prescribed threshold.

When misdirection has occurred in the first head 10 (S31: YES), in S32 the control device 50 determines whether the ink ejection portion (more specifically, nozzles) in which this misdirection has occurred is the overlapped portion of the first head 10 and second head 20. If the ink ejection portion in which the misdirection has occurred is nozzles in the overlapped portion of the first head 10 with the second head 20 (S32: YES), in S33 the control device 50 sets the contribution percentages of the first head 10 and second head 20 to a normal distribution, and subsequent ends the selection process. However, if the ink ejection portion in which misdirection has occurred is not nozzles in the overlapped portion of the first head 10 (S32: NO), in S34 the control device 50 selects the second head 20 to be a head with a higher contribution percentage, and subsequently ends the selection process.

On the other hand, when the control device 50 determines in S31 that misdirection has not occurred in the first head 10 (S31: NO), in S35 the control device 50 determines whether misdirection has occurred in the second head 20. If misdirection has occurred in the second head 20 (S35: YES), in S36 the control device 50 determines whether the ink ejection portion (more specifically, nozzles) in which the misdirection has occurred is nozzles in the overlapped portion of the second head 20 with the first head 10. If the ink ejection portion in which the misdirection has occurred is nozzles in the overlapped portion of the second head 20 (S36: YES), in S37 the control device 50 sets the contribution percentages of the first head 10 and second head 20 to a normal distribution, and subsequently ends the selection process. However, if the ink ejection portion in which misdirection has occurred is not the overlapped portion of the second head 20 (S36: NO), in S38 the control device 50 selects the first head 10 to be a head with a higher contribution percentage, and subsequently ends the selection process.

However, if the control device 50 determines in S35 that misdirection has not occurred in the second head 20 (S35: NO), in S39 the control device 50 determines whether the nozzle diameter in the second head 20 is smaller than the nozzle diameter in the first head 10. If the nozzle diameter in the second head 20 is smaller than the nozzle diameter in the first head (S39: YES), in S40 the control device 50 selects the first head 10 to be a head with a higher contribution percentage, and subsequently ends the selection process. However, if the nozzle diameter of the second head 20 is not smaller than the nozzle diameter in the first head (S39: NO), in S41 the control device 50 selects the second head 20 to be a head with a higher contribution percentage, and subsequently ends the selection process.

Through the second example of the selection process described above, the control device 50 selects the head having the lower frequency of misdirection and the larger nozzle diameter since nozzle variation in this head is easier to correct. An additional condition for making this determination is whether the printing area is printed using nozzles in the overlapped portion of the first head 10 and second head 20. The nozzles in the overlapped portion of the first head 10 and the second head 20 are examples of the specific first nozzle and the specific second nozzle of the present disclosure.

Figure 9:
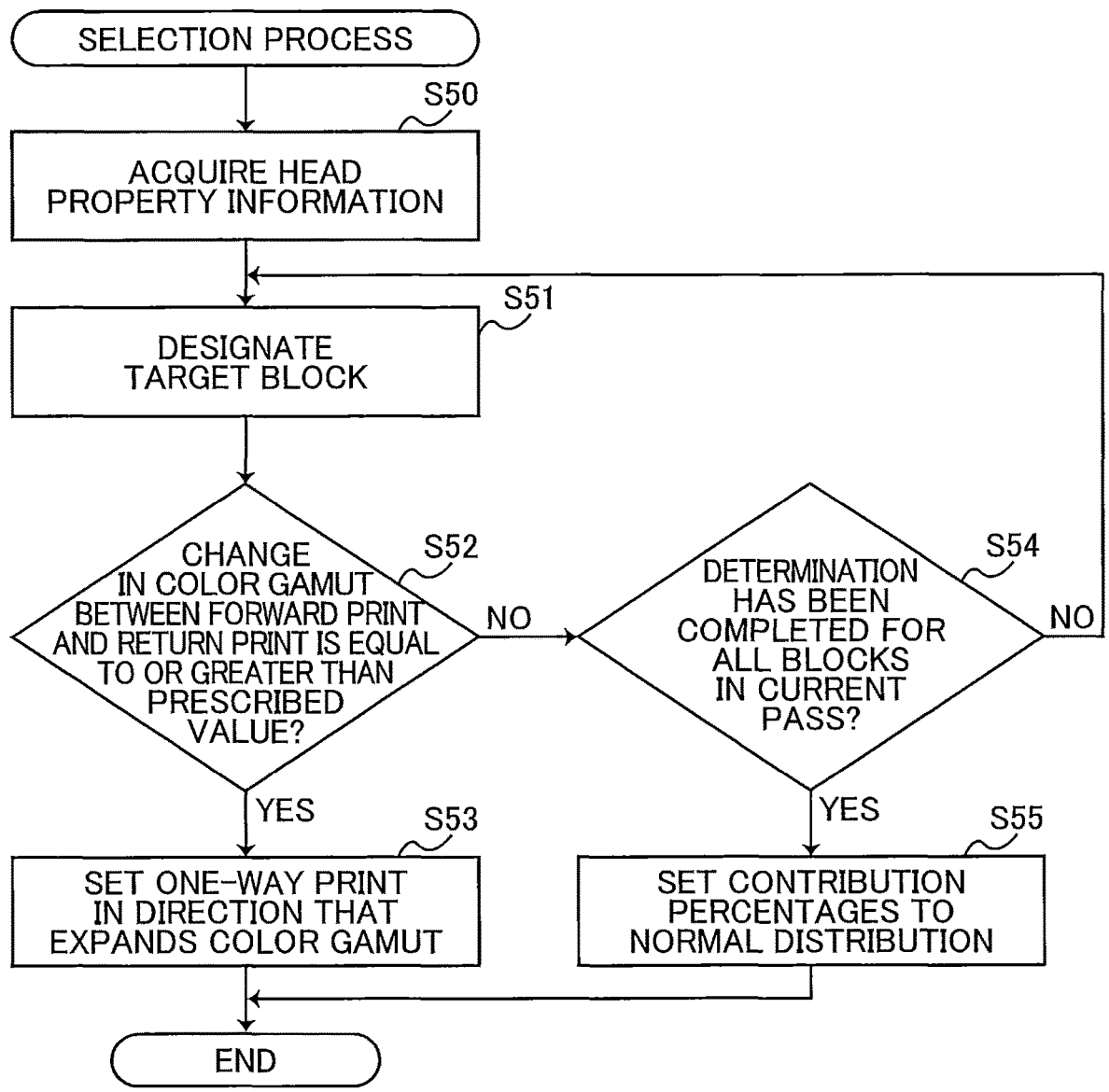
FIG. 9 is a flowchart illustrating steps in a third example of the selection process executed by the control device illustrated in FIG. 2.

Next, a third example of the selectin process will be described with reference to FIGS. 8 and 9. FIG. 8 is a schematic diagram of an image process in which the color gamut is different when printing by moving the first head 10 and second head 20 of the printing apparatus 1 rightward in the main scanning direction Ds (the forward direction indicated by the arrow shown in FIG. 8) and when printing by moving the first head 10 and second head 20 leftward in the main scanning direction Ds (the return direction). FIG. 9 is a flowchart illustrating steps in the third example of the selection process performed by the control device 50 of the printing apparatus 1. Note that FIG. 8 has been simplified for purposes of explaining the image process. The forward direction and return direction are examples of the first direction and second direction of the present disclosure. The third example of the selection process is an example of the (f) selecting of the present disclosure.

As illustrated in FIG. 3A, each nozzle row set in the first head 10 and second head 20 has a plurality of nozzles arranged at regular intervals along the conveying direction Df. While the carriage 3 is in the idle position (the left side, as shown in FIG. 1), the nozzle row sets in the respective first head 10 and second head 20 of the present embodiment are arranged in the order of nozzle row sets 11 and 21 for yellow (Y), nozzle row sets 12 and 22 for magenta (M), nozzle row sets 13 and 23 for cyan (C), and nozzle row sets 14 and nozzle row set 24 for black (K) beginning from the right side (from the downstream side in the forward direction) and progressing leftward (toward the upstream side in the forward direction).

When performing a two-way scan in which the carriage 3 is reciprocated in both directions along the main scanning direction Ds (the forward direction and return direction) with the nozzle row sets having this arrangement, ink is ejected in a sequence beginning from yellow (Y) when the carriage 3 is scanned from left to right in the forward direction and in a sequence beginning from black (K) when the carriage 3 is scanned from right to left in the return direction. Consequently, the color gamut for the forward direction differs from the color gamut of the return direction.

Prior to printing the target image, one pass worth of the image is divided into a plurality of blocks and RGB values are derived for each block unit. Next, weights are calculated based on the RGB values in each block unit to determine whether color reproducibility is maintained. When the weight per unit area in a block exceeds a threshold value, printing of the pass for that block is controlled as a one-way scan (a forward scan in the present embodiment). The threshold value for the weight is set based on whether the color gamut is changed. If the color gamut is changed based on the sequence of ink ejection during printing, the control device 50 performs control to print in a one-way scan along the main scanning direction Ds (the forward direction in the present embodiment) to expand the color gamut. In other words, the control device 50 selects the direction for which the color gamut is wider than the color gamut for the other direction as a printing direction, and performs control to perform printing for the pass in a one-way scan along the selected printing direction. For example, when the color gamut when printing in the forward direction is wider than the color gamut when printing in the return direction, the forward direction is selected as the printing direction.

Note that FIG. 8 provides one example of weights for each block unit. In this example, 1.0 is a value that exceeds the threshold. Thus, a one-way scan is used to print passes that include blocks having a weight of 1.0. The pass shown in FIG. 8 includes blocks having a weight of 1.0. Hence, the forward direction would be selected as the printing direction for this pass, as described below with reference to FIG. 9.

In S50 of FIG. 9, the control device 50 acquires head property information for the first head 10 and second head 20. The head property information includes information indicating one of the forward direction and reverse direction that expands the color gamut. In S51 the control device designates a single block from among a plurality of blocks included in the current pass as a target block. In S52 the control device 50 determines for the target block whether the color gamut when printing in the rightward (forward) direction (a forward print) differs from the color gamut when printing in the leftward (return) direction (a return print) by a prescribed value or greater. Specifically, the control device 50 determines that the difference in color gamut between a forward print and a return print is equal to or greater than the prescribed value when the weight for the target block exceeds the threshold.

If the change in color gamut is equal to or greater than the prescribed value (S52: YES), in S53 the control device 50 selects the direction that expands the color gamut as the printing direction, sets a one-way print in the selected printing direction for the pass, and subsequently ends the selection process. For example, when the forward direction is selected as the printing direction, the forward print is set for the pass and printing is performed only when the carriage 3 moves in the forward direction. In this case, the contribution ratio of the first head 10 and second head 20 can be set to 100:0, for example. When the head property information for the first head 10 includes the information indicating the forward direction but the head property information for the second head 20 includes the information indicating the reverse direction, the contribution percentages of the first head 10 and second head 20 are set to 100% and 0% respectively, and the forward print is performed for the pass by ejecting ink from the first head 10. With this method, the printing speed drops since the pass is printed only in one direction.

However, if the change in color gamut is smaller than the prescribed value (S52: NO), in S54 the control device 50 determines whether the determination in S52 has been completed for all blocks included in the current pass. If the determination has not been completed (S54: NO), the control device 50 returns to the process in S51 to designate one of unprocessed blocks as a target block, and repeats the process from S52 for the target block.

Once the determination has been completed for all blocks in the pass (S54: YES), in S55 the control device 50 sets the contribution percentages of the first head 10 and second head 20 to a normal distribution, and subsequently ends the selection process. In this case, the contribution ratio of the first head 10 and second head 20 can be set to 50:50. Further, printing speed is increased since a two-way print is performed for the pass.

Thereafter, the control device 50 executes a print in the second mode by ejecting ink from the first head 10 and second head 20 at the contribution ratio set in the selection process. Through this process, the control device 50 can prevent a drop in color reproducibility caused by changes in the color gamut.

Figure 10:
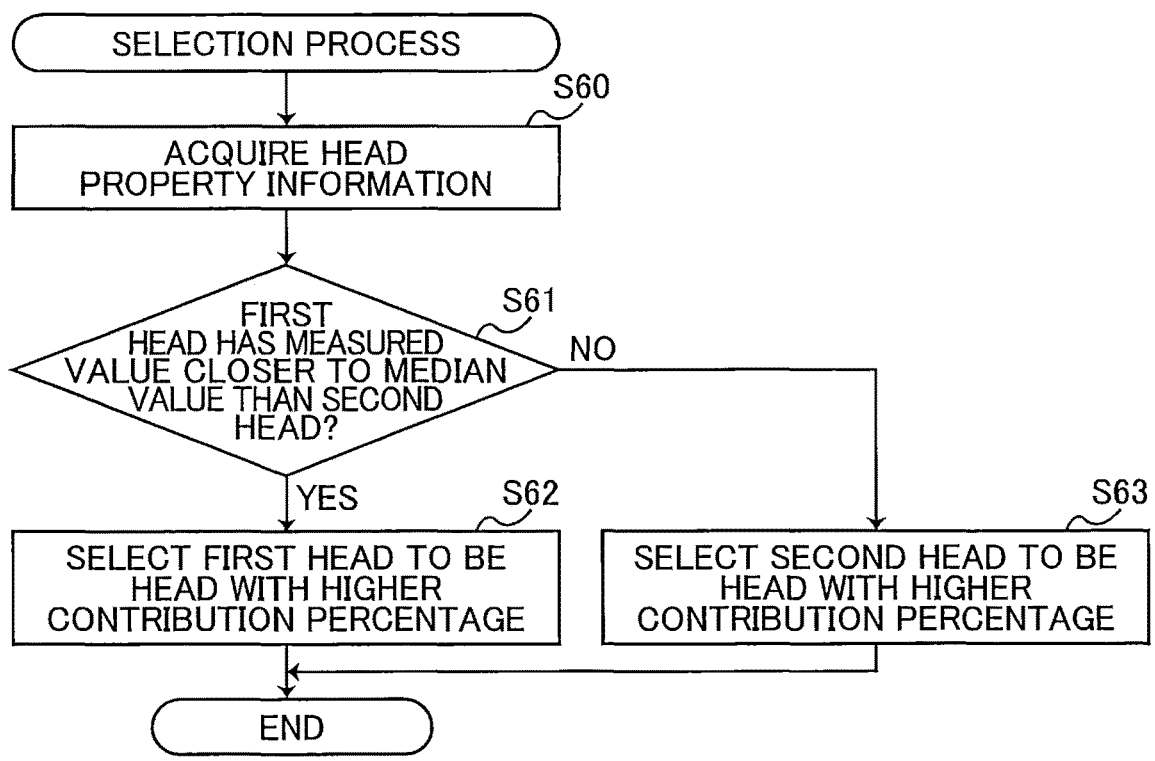
FIG. 10 is a flowchart illustrating steps in a fourth example of the selection process executed by the control device illustrated in FIG. 2.

FIG. 10 is a flowchart showing steps in a fourth example of the selection process executed by the control device 50 of the printing apparatus 1. In the fourth example of the selection process of FIG. 10, the control device 50 selects a head with a higher contribution percentage when printing in the second mode based on manufacturing error in the first head 10 and second head 20. The fourth example of the selection process is an example of the (g-1) selecting of the present disclosure.

Here, head property information can be stored in the storage device 40. The head property information may include a measured value for the ink channels in the first head 10 measured when the first head 10 was manufactured and a median value for the ink channels in the first head 10 (a representative value that is a design value), and a measured value for the ink channels in the second head 20 measured when the second head 20 was manufactured and a median value for the ink channels in the second head 20 (a representative value that is a design value).

The control device 50 performs the selection process in FIG. 10 when printing in the second mode. In S60 at the beginning of this process, the control device 50 acquires head property information. In S61 the control device 50 determines whether the measured value for the ink channels in the first head 10 is closer to its median value than the measured value for the ink channels in the second head 20 is to its median value. If the measured value for the ink channels in the first head 10 is closer to its median value than the measured value for the ink channels in the second head 20 is to its median value (S61: YES), in S62 the control device 50 selects the first head 10 to be a head with a higher contribution percentage, and subsequently ends the selection process. However, if the measured value for the ink channels in the second head 20 is closer to its median value than the measured value for ink channels in the first head 10 is to its median value (S61: NO), in S63 the control device 50 selects the second head 20 to be a head with a higher contribution percentage, and subsequently ends the selection process. Thus, in the fourth example of the selection process, the control device 50 selects a head with a higher contribution percentage based on the consideration that the head having a measured value for ink channels closer to the median value will have more stable ink ejection.

In the example shown in FIG. 4, the ink tank 6 provided in the printing apparatus 1 is connected to the first head 10 by the first ink tube 16 and is connected to the second head 20 by the second ink tube 26. Further, priority level information can be set so that the priority levels indicate which of the first head 10 and second head 20 would be most favorably selected to be a head with a higher contribution percentage based on the layout of the first head 10 and second head 20 relative to the conveying direction Df of the printing medium W, the arrangement of the printing medium W relative to the main scanning direction Ds in which the first head 10 and second head 20 move, and the like. The priority level information can be set based on favorability of ink supply and low probability of damage, for example. Priority level information indicating priority levels based on the layout of the first head and second head 20 are stored in the storage device 40.

The control device 50 executes the contribution percentage setting process when printing in the second mode to set the contribution percentages at which the first head 10 and second head 20 contribute to ink ejection with respect to the density of dots constituting the image. The control device 50 executes a fifth example of the selection process for selecting one of the first head 10 and second head 20 to be a head with a higher ink ejection contribution percentage based on these priority levels indicated by the priority level information. Through this fifth example of the selection process, the control device 50 selects a head with a higher contribution percentage toward ink ejection based on the layout of the first head 10 and second head 20. The priority level information is set to indicate the priority level higher for the first head 10 or second head 20 having the more favorable ink channel length, layout, and the like. Specifically, the control device 50 can perform the fifth example of the selection process as follows. The fifth example of the selection process is an example of the (h-1) selecting of the present disclosure.

In the fifth example of the selection process, the control device 50 determines that the head among the first head 10 and second head 20 connected by the shorter one of the first ink tubes 16 and second ink tubes 26 (see FIG. 4) is a head having a higher priority and can select this head as a head with a higher ink contribution percentage. This selection is based on the consideration that the head connected with the shorter ink tubes supplies ink more readily. In the example of FIG. 4, the first ink tubes 16 are shorter than the second ink tubes 26. Since the first ink tubes 16 are shorter than the second ink tubes 26 and ink is more readily supplied through the shorter ink tubes, the first head 10 connected to the first ink tubes 16 can be said to be in better condition.

In the fifth example of the selection process, the control device 50 also determines that the head among the first head 10 and second head 20 positioned upstream in the main scanning direction Ds (the forward direction) when the carriage 3 moves in the main scanning direction Ds from the idle position has a higher priority level and can select this head to be a head with a higher ink contribution percentage. This selection is based on the consideration that the head positioned upstream in the main scanning direction Ds (the forward direction) when the carriage 3 moves in the main scanning direction Ds from the idle position (the position in FIG. 1) has fewer opportunities to print and, hence, is in better condition. When the carriage 3 begins moving in the main scanning direction Ds from the idle position shown in FIG. 1, the second head 20 begins printing first. Since movement of the carriage 3 normally begins from the idle position, the first head 10 has fewer printing opportunities than the second head 20. Therefore, the first head 10 can be said to be in better condition.

In the fifth example of the selection process, the control device 50 also determines that the head among the first head 10 and second head 20 farther from the opening 2a has a higher priority level and can select this head to be a head with a higher ink contribution percentage. This selection is based on the consideration that the head farther from the opening 2a, i.e., the head positioned upstream in the conveying direction Df of the printing medium W has fewer opportunities to contact the printing medium W than the head closer to the opening 2a, i.e., the head positioned upstream in the conveying direction Df of the printing medium W. In the example of FIG. 1, the first head 10 is the head farther from the opening 2a. The tray 7 is moved rearward (the direction opposite to the conveying direction Df of the printing medium W) in FIG. 1 by the drive force of the conveying motor 32 prior to a printing process. Since the second head 20 is positioned forward of the first head 10, the second head 20 is more likely to contact the printing medium W before the first head 10 as the printing medium W fixed to the tray 7 moves rearward together with the tray 7. If the second head 20 contacts the printing medium W, the user or the printing apparatus 1 halts movement of the tray 7 at the moment of contact to prevent damage to the second head 20. Consequently, there is a lower probability that the first head 10 will contact the printing medium W than the probability that the second head 20 will contact the printing medium W. Since the first head 10 that is farther from the opening 2a and is positioned upstream in the conveying direction Df of the printing medium W has fewer opportunities to contact the printing medium W than the second head 20 that is closer to the opening 2a and is positioned downstream in the conveying direction Df of the printing medium W, the first head 10 can be considered to be in better condition.

Figure 11:
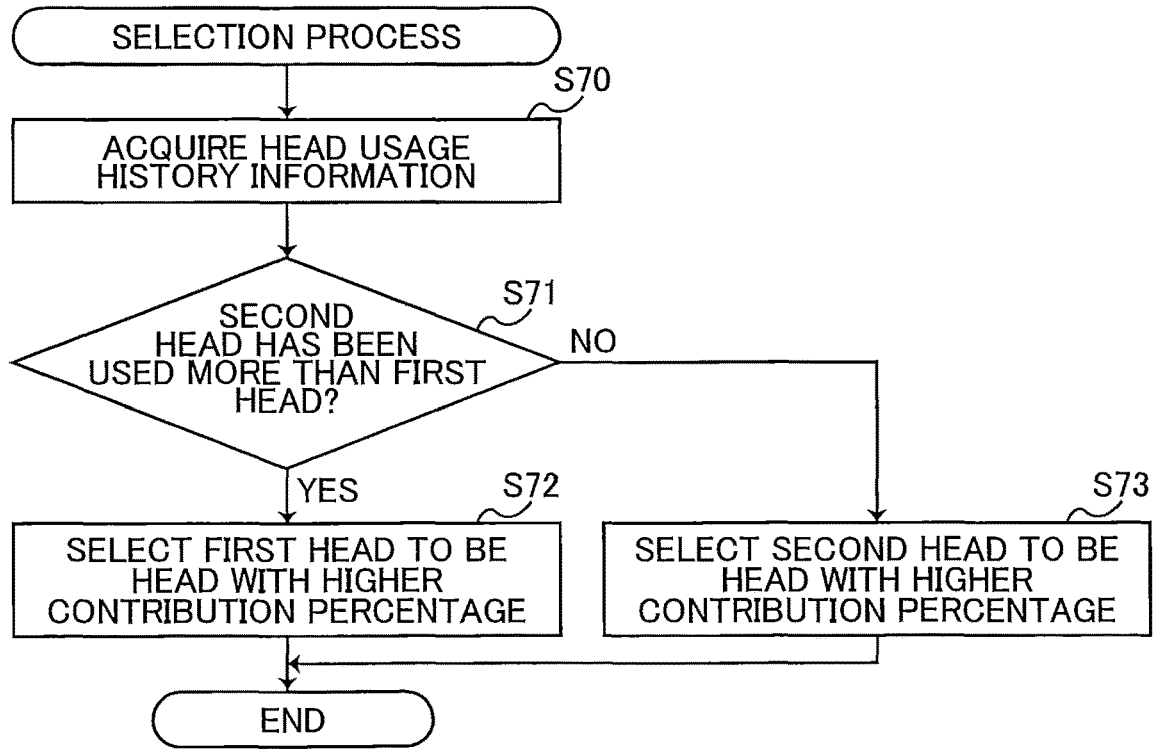
FIG. 11 is a flowchart illustrating steps in a sixth example of the selection process executed by the control device illustrated in FIG. 2.

FIG. 11 is a flowchart illustrating steps in a sixth example of the selection process executed by the control device 50 of the printing apparatus 1. In the example of FIG. 11, the control device 50 selects a head with a higher contribution percentage of ink ejection when printing in the second mode based on usage history of the first head 10 and second head 20. The sixth example of the selection process is an example of the (j-1) selecting of the present disclosure.

Usage history information stored in the storage device 40 and indicating usage history may include information on usage time for the first head 10 after the first head 10 was last replaced and information on the usage time for the second head 20 after the second head 20 was last replaced. Usage history information stored in the storage device 40 may also include information on the total ink ejection quantity for the first head 10 and information on the total ink ejection quantity for the second head 20. Usage history information stored in the storage device 40 may also include opportunities for pin omissions in the first head 10 and second head 20. Usage history information stored in the storage device 40 may also include the number of purges on the first head 10 and second head 20 including the number of suction purges and the number of pressure purges. The opportunities for pin omissions may be stored as the number of times ink could not be ejected from a nozzle. The number of purges may be stored as the number of times ink was discharged from a head.

In S70 of the sixth example of the selection process of FIG. 11, the control device 50 acquires head usage history information. In S71 the control device 50 determines whether the second head 20 has been used more than the first head 10. The control device 50 makes this determination based on information on usage time, total ink ejection quantity, fewest opportunities for pin omissions, and the like described above. If the second head 20 has been used more than the first head 10 (S71: YES), in S72 the control device 50 selects the first head 10 to be a head with a higher contribution percentage, and subsequently ends the selection process. However, if the second head 20 has not been used more than the first head 10 (S71: NO), in S73 the control device 50 selects the second head 20 to be a head with a higher contribution percentage, and subsequently ends the selection process. Thus, in the sixth example of the selection process, the control device 50 determines which head is in better condition based on information on usage time, information on the total ink ejection quantity, information on pin omissions, and the like and selects the head in better condition to be a head with a higher contribution percentage.

Figure 12:
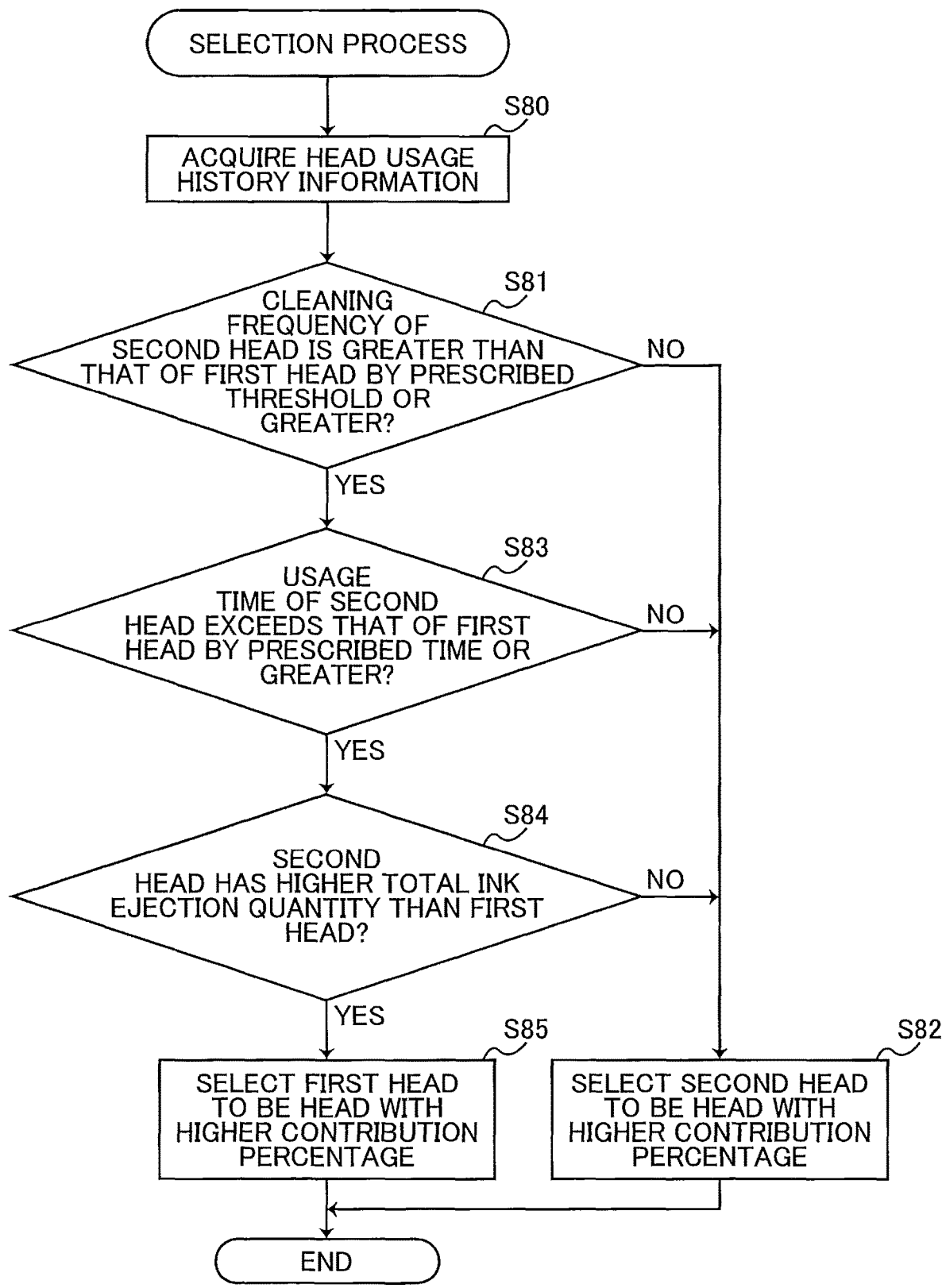
FIG. 12 is a flowchart illustrating steps in a seventh example of the selection process executed by the control device illustrated in FIG. 2.

FIG. 12 is a flowchart illustrating steps in a seventh example of the selectin process executed by the control device 50 of the printing apparatus 1. The seventh example of the selection process of FIG. 12 is performed to select one of the first head 10 and second head 20 to have the higher contribution percentage of ink ejection when printing in the second mode. The seventh example of the selection process is an example of the (j-1) selecting of the present disclosure.

Usage history information stored in the storage device 40 and indicating usage history may include information specifying the number of times the cleaning process has been executed for the first head 10, and information specifying the number of times the cleaning process has been executed for the second head 20. Usage history information stored in the storage device 40 may also include information specifying the amount of time that has elapsed after the last replacement of the first head 10, and information specifying the amount of time that has elapsed after the last replacement of the second head 10. Usage history information stored in the storage device 40 may also include information specifying the total ink ejection quantity for the first head 10, and information specifying the total ink ejection quantity for the second head 20.

In the seventh example of the selection process performed when printing in the second mode, the control device 50 determines which of the first head 10 and second head 20 is the head having the less number of times that the cleaning process has been executed therefor, i.e., the head having the smaller cleaning frequency, the head having the less amount of elapsed time after the last replacement thereof, or the head having the smaller total ejection quantity. Based on these results, the control device 50 can select one of the heads to have a higher contribution percentage of ink ejection. Through this process, the control device 50 can properly determine which of the first head 10 and second head 20 is in better condition and can select the head with the higher contribution percentage. Specifically, the control device 50 performs the seventh example of the selection process as follows.

In S80 of the seventh example of the selection process of FIG. 12, the control device 50 acquires the head usage history information. In S81 the control device 50 determines whether the second head 20 has a greater number of times that the cleaning process has been executed than the first head 10 by the prescribed threshold or greater. In other words, in S81 the control device 50 determines whether the second head 20 has a cleaning frequency greater than a cleaning frequency of the first head by the prescribed threshold or greater. If the cleaning frequency of the second head 20 is not greater than the cleaning frequency of the first head 10 by the prescribed threshold or greater (S81: NO), in S82 the control device 50 selects the second head 20 to be a head with a higher contribution percentage, and subsequently ends the seventh example of the selection process. This selection is made based on the consideration that the head hat has undergone fewer cleaning processes is in better condition.

Alternatively, in the determination of S81 the control device 50 may select the head among the first head 10 and second head 20 whose cleaning frequency has not exceeded a threshold value to be a head with a higher contribution percentage. This selection is made based on the consideration that a head that has undergone fewer cleaning processes than the threshold value is in good condition.

In the present embodiment, if the control device 50 determines in S81 that the second head 20 has a cleaning frequency greater than a cleaning frequency of the first head 10 and that the difference between the cleaning frequency of the second head 20 and the cleaning frequency of the first head 10 is equal to or greater than the prescribed threshold (S81: YES), in S83 the control device 50 determines whether the usage time of the second head 20 is greater than the usage time of the first head 10 by a prescribed time or greater. If the usage time of the second head 20 is not greater than the usage time of the first head 10 by the prescribed time or greater (S83: NO), in S82 the control device 50 selects the second head 20 to be a head with a higher contribution percentage, and subsequently ends the seventh example of the selection process. This selection is made based on the consideration that the head having lower usage is in better condition.

Alternatively, in the seventh example of the selection process the control device 50 may select the head among the first head 10 and second head 20 having the shorter elapsed time after the last replacement to be a head with a higher contribution percentage based on the usage history. This selection is made based on the consideration that the head for which a shorter amount of time has elapsed since first being used is in better condition.

In the present embodiment, if the usage time of the second head 20 does exceed the usage time of the first head 10 by the prescribed time or greater (S83: YES), in S84 the control device 50 determines whether the second head 20 has a higher total ink ejection quantity than the first head 10. If the total ink ejection quantity for the second head 20 is not higher than the total ink ejection quantity for the first head (S84: NO), in S82 the control device 50 selects the second head 20 to be a head with a higher contribution percentage, and subsequently ends the seventh example of the selection process. On the other hand, if the total ink ejection quantity for the second head 20 is higher than the total ink quantity for the first head (S84: YES), in S85 the control device 50 selects the first head 10 to be a head with a higher contribution percentage, and subsequently ends the seventh example of the selection process. This selection is made based on the consideration that the head with a lower total ink ejection quantity is in better condition.

Alternatively, in the seventh example of the selection process the control device 50 may select the head among the first head 10 and second head 20 whose total ink ejection quantity is lower based on the usage history to be a head with a higher ink contribution percentage. This selection is made based on the consideration that a head with a lower total ink ejection quantity is in better condition.

Thus, in the second mode the control device 50 selects one of the first head 10 and second head 20 to be a head with a higher contribution percentage and executes printing by ejecting ink from the first head 10 and second head 20 to achieve a total contribution percentage of 100%. By setting a higher contribution percentage for the more stable head in this way, the control device 50 can perform suitable printing with high color reproducibility.

The selection process executed by the control device 50 can be achieved according to the following embodiment. The following embodiment is an example for setting the contribution percentages of ink ejection from the first head 10 and second head 20 based on the condition of nozzles in the nozzle row sets for each of the first head 10 and second head 20.

When executing the contribution percentage setting process in this embodiment for setting the contribution percentages of ink ejection from the first head 10 and second head 20 with respect to the density of dots constituting the image being printed in the second mode, a predetermined mask is used in the contribution percentage setting unit 50b, but the present disclosure is not limited to this configuration. The control device 50 may generate a new mask in the contribution percentage setting unit 50b.

(1) The new mask determines whether misdirection of ink ejection has occurred for all nozzles assigned the same number among the nozzle row sets for the first head 10 and second head 20. Next, the nozzles in which misdirection has occurred are masked and printing is executed by ejecting ink using nozzles in which misdirection has not occurred. In this case, ink equivalent to the contribution percentage of masked nozzles in the head with masked nozzles is ejected from nozzles in the other head.

(2) A mask may be configured to mask nozzles that are not being used and not to mask nozzles that are being used for reducing the occurrence of density differences between printing areas printed using overlapped portions in which the first head 10 and second head 20 overlap in the conveying direction Df and printing areas printed using non-overlapped portions in which the first head 10 and second head 20 do not overlap in the conveying direction Df so that the user cannot recognize such density differences. Similarly, a new mask may be configured to mask nozzles that are not being used and not to mask nozzles that are being used when misdirection has not occurred in nozzles assigned the same number among both nozzle row sets in the first head 10 and nozzle row sets in the second head 20 and when nozzles assigned the same number in both the first head 10 and second head 20 have an ink ejection portion positioned in the overlapped portions of the first head 10 and second head 20.

(3) A new mask may also be configured to mask nozzles not being used and not to mask nozzles being used based on the diameter of relevant nozzles in the first head 10 and the diameter of relevant nozzles in the second head 20 when nozzles assigned the same number in both nozzle row sets of the first head 10 and nozzle row sets of the second head 20 have an ink ejection portion that is not positioned in the overlapped portions of the first head 10 and second head 20. Specifically, the new mask masks relevant nozzles in the second head 20 and does not mask relevant nozzles in the first head 10 when the diameter of the relevant nozzles in the first head 10 is greater than the diameter of the relevant nozzles in the second head 20. On the other hand, the new mask masks relevant nozzles in the first head 10 and does not mask relevant nozzles in the second head 20 when the diameter of the relevant nozzles in the second head 20 is greater than the diameter of the relevant nozzles in the first head 10.

These new masks may be human-generated. Once an entire pass worth of image data has been converted in the process of FIG. 5 described above, the control device 50 determines whether a calibration LUT has been referenced during color conversion (S17), sets the operating mode of the printing apparatus 1 to the second mode (S18) when determining that a calibration LUT has been referenced during color conversion, and performs printing in the second mode using the new mask. However, when the control device 50 determines that a calibration LUT has not been referenced during color conversion, the control device 50 sets the operating mode of the printing apparatus 1 to the first mode (S19) and performs printing in the first mode without using the new mask.

As described above, the printing apparatus 1 has a first mode and a second mode for printing images, and the second mode executes printing with higher color reproducibility than the first mode. In the first mode, the printing apparatus 1 executes printing by ejecting ink at a contribution percentage of 100% from each of the first head 10 and second head 20. In the second mode, the printing apparatus 1 executes printing by ejecting ink so that the contribution percentages for the first head 10 and second head 20 total 100%. Accordingly, when printing requires high color reproducibility, the printing apparatus 1 can eject ink at a contribution percentage from the first head 10 and second head 20 totaling 100% in the second mode to achieve this high color reproducibility.

In the embodiment described above, the printing unit 50c executes printing by ejecting ink at a contribution percentage of 100% from each of the first head 10 and second head 20 when the operating mode is set to the first mode, but the present disclosure is not limited to this configuration. When the operating mode is set to the first mode, the printing unit 50c may eject ink at approximately 100% contribution percentage from each of the first head 10 and second head 20. Here, approximately 100% includes a range of about 95%-105%.

Further, in the embodiment described above, the printing unit 50c executes printing by ejecting ink from both the first head 10 and second head 20 such that their contribution percentages total 100% when the operating mode is set to the second mode, but the present disclosure is not limited to this configuration. When the operating mode is set to the second mode, the printing unit 50c may execute printing by ejecting ink from both the first head 10 and second head 20 so that their total contribution percentage is approximately 100%. Here, approximately 100% includes a range of about 95%-105%.

What is claimed is:

1. A printing apparatus comprising:
   a first head having at least one first nozzle configured to eject ink in a first color;
   a second head having at least one second nozzle configured to eject ink in a second color same as the first color;
   a carriage configured to support the first head and the second head, the carriage being reciprocally movable in a first direction and a second direction opposite to the first direction;
   a storage device;
   a conveying device configured to convey a printing medium in a third direction crossing the first direction and the second direction; and
   a control device configured to perform:
      (a) setting an operation mode to one of a first mode and a second mode; and
      (b) executing one of a first printing operation and a second printing operation in accordance with the operation mode set in the (a) setting, the first printing operation being performed in a case where the first mode is set as the operation mode, the second printing operation being performed in a case where the second mode is set as the operation mode, the first printing operation printing a first image over a first range in the third direction by ejecting ink from both the first head and the second head during one movement of the carriage in the first direction and the second direction, the second printing operation printing a second image over a second range in the third direction by ejecting ink from both the first head and the second head during the one movement of the carriage in the first direction and the second direction,
   wherein the second range is narrower than the first range in the third direction, ink ejection contribution during the one movement of the carriage in the first direction and the second direction being shared by the first head and the second head at a prescribed contribution ratio in the second printing operation,
   wherein the first head and the second head are arranged to be partially overlapped in the third direction, a specific first nozzle among the at least one first nozzle and a specific second nozzle among the at least one second nozzle being positioned in an overlapped portion of the first head and the second head,
   wherein the control device is configured to further perform:
      (c) setting an ink ejection contribution percentage based on the prescribed contribution ratio for each of the first head and the second head with respect to density of dots constituting the second image to be printed in the second printing operation, the (c) setting comprising:
         (c-1) determining whether misdirection of ink ejection occurs in one of the specific first nozzle and the specific second nozzle; and (c-2) selecting one of the first head and the second head to be a head with a higher ink ejection contribution percentage based on a result of the (c-1) determining, wherein the (c-2) selecting selects the first head to be the head with the higher ink ejection contribution percentage in a case where the misdirection occurs in the specific first nozzle, and wherein the (c-2) selecting selects the second head to be the head with the higher ink ejection contribution percentage in a case where the misdirection occurs in the specific second nozzle.

2. A printing apparatus comprising:

a first head having at least one first nozzle configured to eject ink in a first color;

a second head having at least one second nozzle configured to eject ink in a second color same as the first color;

a carriage configured to support the first head and the second head, the carriage being reciprocally movable in a first direction and a second direction opposite to the first direction;

a storage device; and a control device configured to perform:
  (a) setting an operation mode to one of a first mode and a second mode; and
  (b) executing one of a first printing operation and a second printing operation in accordance with the operation mode set in the (a) setting, the first printing operation being performed in a case where the first mode is set as the operation mode, the second printing operation being performed in a case where the second mode is set as the operation mode, the first printing operation printing a first image over a first range in a third direction crossing the first direction and the second direction by ejecting ink from both the first head and the second head during one movement of the carriage in the first direction and the second direction, the second printing operation printing a second image over a second range in the third direction by ejecting ink from both the first head and the second head during the one movement of the carriage in the first direction and the second direction, wherein the second range is narrower than the first range in the third direction, ink ejection contribution during the one movement of the carriage in the first direction and the second direction being shared by the first head and the second head at a prescribed contribution ratio in the second printing operation, wherein the storage device is configured to store nozzle property information, the nozzle property information including nozzle property information for the first head and nozzle property information for the second head, the nozzle property information for the first head indicating an ink ejection property of the at least one first nozzle, the nozzle property information for the second head indicating an ink ejection property of the at least one second nozzle, and wherein the control device is configured to further perform:
  (d) setting an ink ejection contribution percentage based on the prescribed contribution ratio for each of the first head and the second head with respect to density of dots constituting the second image to be printed in the second printing operation, the (d) setting comprising:
    (d-1) selecting one of the first head and the second head to be a head with a higher ink ejection contribution percentage based on the nozzle property information.

3. The printing apparatus according to claim 2, wherein the at least one first nozzle comprises a plurality of first nozzles having respective ones of a plurality of first diameters, and the at least one second nozzle comprises a plurality of second nozzles having respective ones of a plurality of second diameters, wherein the nozzle property information for the first head indicates first variation in the plurality of first diameters and the nozzle property information for the second head indicates second variation in the plurality of second diameters, wherein the (d-1) selecting selects the first head to be the head with the higher ink ejection contribution percentage in a case where the first variation is less than the second variation, and wherein the (d-1) selecting selects the second head to be the head with the higher ink ejection contribution percentage in a case where the second variation is less than the first variation.

4. The printing apparatus according to claim 2, wherein the at least one first nozzle comprises a plurality of first nozzles, and the at least one second nozzle comprises a plurality of second nozzles, wherein the nozzle property information for the first head indicates a first minimum droplet quantity ejected from the plurality of first nozzles, and the nozzle property information for the second head indicates a second minimum droplet quantity ejected from the plurality of second nozzles, wherein the (d-1) selecting selects the first head to be the head with the higher ink ejection contribution percentage in a case where the first minimum droplet quantity is greater than the second minimum droplet quantity, and wherein the (d-1) selecting selects the second head to be the head with the higher ink ejection contribution percentage in a case where the second minimum droplet quantity is greater than the first minimum droplet quantity.

5. A printing apparatus comprising:

a first head having at least one first nozzle configured to eject ink in a first color;

a second head having at least one second nozzle configured to eject ink in a second color same as the first color;

a carriage configured to support the first head and the second head, the carriage being reciprocally movable in a first direction and a second direction opposite to the first direction;

a storage device; and a control device configured to perform:
  (a) setting an operation mode to one of a first mode and a second mode;
  (b) executing one of a first printing operation and a second printing operation in accordance with the operation mode set in the (a) setting, the first printing operation being performed in a case where the first mode is set as the operation mode, the second printing operation being performed in a case where the second mode is set as the operation mode, the first printing operation printing a first image over a first range in a third direction crossing the first direction and the second direction by ejecting ink from both the first head and the second head during one movement of the carriage in the first direction and the second direction, the second printing operation printing a second image over a second range in the third direction by ejecting ink from both the first head and the second head during the one movement of the carriage in the first direction and the second direction;

(e) determining whether a first color gamut when performing a printing operation during one movement of the carriage in the first direction differs from a second color gamut when performing a printing operation during one movement of the carriage in the second direction due to an arrangement of the at least one first nozzle and the at least one second nozzle in the first head and the second head; and (f) selecting, in response to determining that the first color gamut differs from the second color gamut, a printing direction from among the first direction and the second direction, the first direction being selected as the printing direction in a case where the first color gamut is wider than the second color gamut, the second direction being selected as the printing direction in a case where the second color gamut is wider than the first color gamut, wherein the second range is narrower than the first range in the third direction, ink ejection contribution during the one movement of the carriage in the first direction and the second direction being shared by the first head and the second head at a prescribed contribution ratio in the second printing operation, and wherein the (b) executing executes the second printing operation by ejecting ink from both the first head and the second head at the prescribed contribution ratio during one movement of the carriage in the printing direction.

6. A printing apparatus comprising:
a first head having at least one first nozzle configured to eject ink in a first color;
a second head having at least one second nozzle configured to eject ink in a second color same as the first color;
a carriage configured to support the first head and the second head, the carriage being reciprocally movable in a first direction and a second direction opposite to the first direction;
a storage device configured to store head property information, the head property information including head property information for the first head and head property information for the second head, the head property information for the first head indicating a shape property of a first ink channel in the first head, the head property information for the second head indicating a shape property of a second ink channel in the second head; and
a control device configured to perform:
 (a) setting an operation mode to one of a first mode and a second mode; and
 (b) executing one of a first printing operation and a second printing operation in accordance with the operation mode set in the (a) setting, the first printing operation being performed in a case where the first mode is set as the operation mode, the second printing operation being performed in a case where the second mode is set as the operation mode, the first printing operation printing a first image over a first range in a third direction crossing the first direction and the second direction by ejecting ink from both the first head and the second head during one movement of the carriage in the first direction and the second direction, the second printing operation printing a second image over a second range in the third direction by ejecting ink from both the first head and the second head during the one movement of the carriage in the first direction and the second direction; and
 (g) setting an ink ejection contribution percentage based on a prescribed contribution ratio for each of the first head and the second head with respect to density of dots constituting the second image to be printed in the second printing operation, the (g) setting comprising:
  (g-1) selecting one of the first head and the second head to be a head with a higher ink ejection contribution percentage based on the head property information.

7. The printing apparatus according to claim 6,
wherein the head property information for the first head includes a first measured value and a first median for a shape of the first ink channel in the first head, and the head property information for the second head includes a second measured value and a second median for a shape of the second ink channel in the second head, the first measured value being measured during manufacturing of the first head, the second measured value being measured during manufacturing of the second head,
wherein the (g-1) selecting selects the first head to be the head with the higher ink ejection contribution percentage in a case where the first measured value is closer to the first median than the second measured value is to the second median, and
wherein the (g-1) selecting selects the second head to be the head with the higher ink ejection contribution percentage in a case where the second measured value is closer to the second median than the first measured value is to the first median.

8. A printing apparatus comprising:
a first head having at least one first nozzle configured to eject ink in a first color;
a second head having at least one second nozzle configured to eject ink in a second color same as the first color;
a carriage configured to support the first head and the second head, the carriage being reciprocally movable in a first direction and a second direction opposite to the first direction;
a storage device; and
a control device configured to perform:
 (a) setting an operation mode to one of a first mode and a second mode; and
 (b) executing one of a first printing operation and a second printing operation in accordance with the operation mode set in the (a) setting, the first printing operation being performed in a case where the first mode is set as the operation mode, the second printing operation being performed in a case where the second mode is set as the operation mode, the first printing operation printing a first image over a first range in a third direction crossing the first direction and the second direction by ejecting ink from both the first head and the second head during one movement of the carriage in the first direction and the second direction, the second printing operation printing a second image over a second range in the third direction by ejecting ink from both the first head and the second head during the one movement of the carriage in the first direction and the second direction, wherein the first head and the second head are arranged to be partially overlapped in the third direction, wherein the storage device is configured to store priority level information indicating a priority level of each of the first head and the second head based on a layout of the first head and the second head in the printing apparatus, and wherein the control device is configured to further perform:

(h) setting an ink ejection contribution percentage based on a prescribed contribution ratio for each of the first head and the second head with respect to density of dots constituting the second image to be printed in the second printing operation, the (h) setting comprising:

(h-1) selecting one of the first head and the second head as a head with a higher ink ejection contribution percentage based on the priority level information, the first head being selected as the head with the higher ink ejection contribution percentage in a case where the priority level of the first head indicated by the priority level information is higher than the priority level of the second head indicated by the priority level information, the second head being selected as the head with the higher ink ejection contribution percentage in a case where the priority level of the second head indicated by the priority level information is higher than the priority level of the first head indicated by the priority level information.

9. The printing apparatus according to claim 8, further comprising:

an ink tank;

a first ink tube configured of an ink channel between the ink tank and the first head, the first ink tube having a first length; and a second ink tube configured of an ink channel between the ink tank and the second head, the second ink tube having a second length, wherein the priority level of the first head indicated by the priority level information is higher than the priority level of the second head indicated by the priority level information in a case where the first length is shorter than the second length, and wherein the priority level of the second head indicated by the priority level information is higher than the priority level of the first head indicated by the priority level information in a case where the second length is shorter than the first length.

10. The printing apparatus according to claim 8, wherein the carriage is configured to move downstream in the first direction from an idle position, wherein the priority level of the first head indicated by the priority level information is higher than the priority level of the second head indicated by the priority level information in a case where the first head is positioned upstream in the first direction from the second head, and wherein the priority level of the second head indicated by the priority level information is higher than the priority level of the first head indicated by the priority level information in a case where the second head is positioned upstream in the first direction from the first head.

11. The printing apparatus according to claim 8, further comprising:

a casing formed with an opening; and a conveying device configured to convey a printing medium downstream in the third direction to discharge the printing medium through the opening, wherein the priority level of the first head indicated by the priority level information is higher than the priority level of the second head indicated by the priority level information in a case where the first head is closer to the opening than the second head is to the opening, and wherein the priority level of the second head indicated by the priority level information is higher than the priority level of the first head indicated by the priority level information in a case where the second head is closer to the opening than the first head is to the opening.

12. A printing apparatus comprising:

a first head having at least one first nozzle configured to eject ink in a first color;

a second head having at least one second nozzle configured to eject ink in a second color same as the first color;

a carriage configured to support the first head and the second head, the carriage being reciprocally movable in a first direction and a second direction opposite to the first direction;

a storage device; and a control device configured to perform:

(a) setting an operation mode to one of a first mode and a second mode;

(b) executing one of a first printing operation and a second printing operation in accordance with the operation mode set in the (a) setting, the first printing operation being performed in a case where the first mode is set as the operation mode, the second printing operation being performed in a case where the second mode is set as the operation mode, the first printing operation printing a first image over a first range in a third direction crossing the first direction and the second direction by ejecting ink from both the first head and the second head during one movement of the carriage in the first direction and the second direction, the second printing operation printing a second image over a second range in the third direction by ejecting ink from both the first head and the second head during the one movement of the carriage in the first direction and the second direction;

(i) storing usage history information in the storage device, the usage history information including usage history information for the first head and usage history information for the second head, the usage history information for the first head indicating usage history of the first head, the usage history information for the second head indicating usage history of the second head; and (j) setting an ink ejection contribution percentage based on a prescribed contribution ratio for each of the first head and the second head with respect to density of dots constituting the second image to be printed in the second printing operation, the (j) setting comprising:

(j-1) selecting one of the first head and the second head to be a head with a higher ink ejection contribution percentage based on the usage history information, the first head being selected to be the head with the higher ink ejection contribution percentage in a case where the second head has been used more than the first head, the second head being selected to be the head with the higher ink ejection contribution percentage in a case where the first head has been used more than the second head.

13. The printing apparatus according to claim 12,
wherein the usage history information for the first head includes: information specifying a first number; information specifying a first amount; and information specifying a first quantity, and the usage history information for the second head includes: information specifying a second number; information specifying a second amount; and information specifying a second quantity, the first number indicating a number of times a cleaning process has been executed for the first head, the first amount indicating an amount of time that has elapsed after last replacement of the first head, the first quantity indicating a total ink ejection quantity for the first head, the second number indicating a number of times a cleaning process has been executed for the second head, the second amount indicating an amount of time that has elapsed after last replacement of the second head, the second quantity indicating a total ink ejection quantity for the second head,
wherein the (j-1) selecting selects the first head to be the head with the higher ink ejection contribution percentage in a case where the first number is smaller than the second number, the first amount is less than the second amount, or the first quantity is smaller than the second quantity, and
wherein the (j-1) selecting selects the second head to be the head with the higher ink ejection contribution percentage in a case where the second number is smaller than the first number, the second amount is less than the first amount, or the second quantity is smaller than the first quantity.

14. The printing apparatus according to claim 13,
wherein the (j-1) selecting selects the first head to be the head with the higher ink ejection contribution percentage in a case where the first number is smaller than the second number by a prescribed threshold, and
wherein the (j-1) selecting selects the second head to be the head with the higher ink ejection contribution percentage in a case where the second number is smaller than the first number by the prescribed threshold.

15. The printing apparatus according to claim 13,
wherein the (j-1) selecting selects the first head to be the head with the higher ink ejection contribution percentage in a case where the first amount is less than the second amount by a prescribed threshold, and
wherein the (j-1) selecting selects the second head to be the head with the higher ink ejection contribution percentage in a case where the second amount is less than the first amount by the prescribed threshold.

16. The printing apparatus according to claim 13,
wherein the (j-1) selecting selects the first head to be the head with the higher ink ejection contribution percentage in a case where the first quantity is smaller than the second quantity, and
wherein the (j-1) selecting selects the second head to be the head with the higher ink ejection contribution percentage in a case where the second quantity is smaller than the first quantity.

* * * * *